(12) United States Patent
Steffens et al.

(10) Patent No.: US 6,301,370 B1
(45) Date of Patent: Oct. 9, 2001

(54) FACE RECOGNITION FROM VIDEO IMAGES

(75) Inventors: Johannes Bernhard Steffens, Culver City; Egor Valerievich Elagin, Los Angeles; Luciano Pasquale Agostino Nocera, Los Angeles; Thomas Maurer, Los Angeles; Hartmut Neven, Santa Monica, all of CA (US)

(73) Assignee: Eyematic Interfaces, Inc., Inglewood, CA (US)

( * ) Notice: Subject to any disclaimer, the term of this patent is extended or adjusted under 35 U.S.C. 154(b) by 0 days.

(21) Appl. No.: 09/206,195

(22) Filed: Dec. 4, 1998

Related U.S. Application Data

(60) Provisional application No. 60/081,615, filed on Apr. 13, 1998.

(51) Int. Cl.[7] .............................. G06K 9/00; G06K 9/36; G06K 9/62; H04N 5/225; G01S 13/00
(52) U.S. Cl. ..................... 382/103; 382/117; 382/118; 382/190; 382/209; 382/276; 342/90; 348/169
(58) Field of Search .................................. 382/117, 118, 382/168, 181, 190, 195, 199, 103, 209, 216, 219, 279, 282, 115, 100, 276; 348/169; 342/90

(56) References Cited

U.S. PATENT DOCUMENTS

| 4,725,824 | 2/1988 | Yoshioka ............................... 340/575 |
| 4,805,224 | 2/1989 | Koezuka et al. ...................... 382/141 |

(List continued on next page.)

FOREIGN PATENT DOCUMENTS

| 44 06 020 C1 | 6/1995 | (DE) ................................. G06K/9/62 |

0 807 902 A2  11/1997  (EP) .

OTHER PUBLICATIONS

Sara, R. et al "3-D Data Acquision and Interpretation for Virtual Reality and Telepresence", Proceedings IEEE Workshop Computer Vision for Virtual Reality Based Human Communication, Bombay, Jan. 1998, 7 pp.
Sara, R. et al "Fish–Scales: Representing Fuzzy Manifolds", Proceedings International Conference Computer Vision, ICCV '98, pp. 811–817, Bombay, Jan. 1998.
Wiskott, L. "Phantom Faces for Face Analysis", *Pattern Recognition*, vol. 30, No. 6, pp. 837–846, 1997.
Wurtz, R., "Object Recognition Robust Under Translations, Deformations, and Changes in Background", *IEEE Transactions on Patern Analysis and Machine Intelligence*, vol. 19, No. 7, Jul. 1997, pp. 769–775.
Akimoto, T., et al, "Automatic Creation of 3–D Facial Models", *IEEE Computer Graphics & Applications.*, pp. 16–22, Sep. 1993.

(List continued on next page.)

*Primary Examiner*—Leo Boudreau
*Assistant Examiner*—Daniel G. Mariam
(74) *Attorney, Agent, or Firm*—Gray Cary Ware Freidenrich

(57) ABSTRACT

The present invention is embodied in an apparatus, and related method, for detecting and recognizing an object in an image frame. The object may be, for example, a head having particular facial characteristics. The object detection process uses robust and computationally efficient techniques. The object identification and recognition process uses an image processing technique based on model graphs and bunch graphs that efficiently represent image features as jets. The jets are composed of wavelet transforms and are processed at nodes or landmark locations on an image corresponding to readily identifiable features. The system of the invention is particularly advantageous for recognizing a person over a wide variety of pose angles.

42 Claims, 21 Drawing Sheets

U.S. PATENT DOCUMENTS

| | | | |
|---|---|---|---|
| 4,827,413 | 5/1989 | Baldwin et al. | 345/126 |
| 5,159,647 | 10/1992 | Burt | 382/103 |
| 5,168,529 | 12/1992 | Peregrim et al. | 382/199 |
| 5,187,574 | 2/1993 | Kosemura et al. | 348/156 |
| 5,220,441 | 6/1993 | Gerstenberger | 358/487 |
| 5,280,530 | 1/1994 | Trew et al. | 382/103 |
| 5,333,165 | 7/1994 | Sun | 378/10 |
| 5,383,013 | 1/1995 | Cox | 356/2 |
| 5,430,809 | 7/1995 | Tomitaka | 382/173 |
| 5,432,712 | 7/1995 | Chan | 382/191 |
| 5,511,153 | 4/1996 | Azarbayejani et al. | 345/419 |
| 5,533,177 | 7/1996 | Wirtz et al. | 345/419 |
| 5,550,928 | 8/1996 | Lu et al. | 382/116 |
| 5,581,625 | 12/1996 | Connell | 382/100 |
| 5,588,033 | 12/1996 | Yeung | 378/4 |
| 5,680,487 | 10/1997 | Markandey | 382/291 |
| 5,699,449 | 12/1997 | Javidi | 382/156 |
| 5,714,997 | 2/1998 | Anderson | 348/39 |
| 5,715,325 | 2/1998 | Bang et al. | 382/118 |
| 5,719,954 | 2/1998 | Onda | 382/154 |
| 5,736,982 | 4/1998 | Suzuki et al. | 345/330 |
| 5,764,803 | 6/1998 | Jacquin et al. | 382/236 |
| 5,774,591 | 6/1998 | Black et al. | 382/236 |
| 5,802,220 | 9/1998 | Black et al. | 382/276 |
| 5,809,171 | 9/1998 | Neff et al. | 382/209 |
| 5,828,769 | 10/1998 | Burns | 382/118 |
| 5,917,937 * | 6/1999 | Szeliski et al. | 382/154 |
| 5,982,853 | 11/1999 | Liebermann | 379/52 |
| 5,995,119 | 11/1999 | Cosatto et al. | 345/473 |
| 6,044,168 | 3/2000 | Tuceryan et al. | 382/118 |
| 6,052,123 | 4/2000 | Lection et al. | 345/419 |

OTHER PUBLICATIONS

Ayache, N., et al, "Rectification of Images for Binocular and Trinocular Stereovision", In IEEE Proceedings of 9th International Conference on Pattern Recognition, pp. 11–16, 1988, Italy.

Belhumeur, P., "A Bayesian Approach to Binocular Stereopsis", *International Journal of Computer Vision*, 19 (3), 1996, pp.237–260.

Beymer, D. J., "Face Recognition Under Varying Pose", Massachusettes Institute of Technology, Artificial Intelligence Laboratory, A.I. Memo No. 1461, 12/93, pp. 1–13.

Beymer, D. J., "Face Recognition Under Varying Pose", Massachusetts Institute of Technology, Artificial Intelligence Laboratory research report, 1994, pp. 756–761.

Buhmann, J. et al, "Distortion Invariant Object Recognition by Matching Hierarchically Labeled Graphs", In Proceedings IJCNN International Conference of Neural Networks, Wash., DC, Jun. 1989, pp. 155–159.

DeCarlo, D., et al, "The Integration of Optical Flow and Deformable Models with Applications to Human Face Shape and Motion Estimation", pp. 1–15, In Proceedings, CVPR '96, pp. 231–238.

Devernay, F., et al, "Computing Differential Properties of 3–D Shapes from Stereoscopic Images without 3–D Models", *INRIA*, RR–2304, 1994, pp. 1–28.

Dhond, U., et al, "Structure from Stereo–A Review", *IEEE Transactions on Systems, Man, and Cybernetics*, vol. 19, No.6, pp. 1489–1510, Nov./Dec. 1989.

Fleet, D. J., et al, "Computation of Component Image Velocity from Local Phase Information", *International Journal of Computer Vision*, vol. 5, No. 1, 1990, pp. 77–104.

Fleet, D.J., "Measurement of Image Velocity", Kluwer International Series in Engineering and Computer Science, Kluwer Academic Publishers, Boston, 1992, No. 169, pp. 1–203.

Hall, E. L., "Computer Image Processing and Recognition", Academic Press, 1979, pp 468–484.

Hong, H., et al, "Online Facial Recognition Based on Personalized Gallery", Proceedings of International Conference on Automatic Face and Gesture Recognition, pp. 1–6, Japan, Apr. 1997.

Kolocsai, P., et al, Statistical Analysis of Gabor–Filter Representation, Proceedings of International Conference on Automatic Face and Gesture Recognition, 1997, 4 pp.

Kruger, N., "Visual Learning with a priori Constraints", *Shaker Verlag*, Aachen, Germany, 1998, pp. 1–131.

Kruger, N., et al, "Principles of Cortical Processing Applied to and Motivated by Artificial Object Recognition", Institut fur Neuroinformatik, *Internal Report 97–17*, Oct. 97, pp. 1–12.

Kruger, N., et al, "Autonomous Learning of Object Representations Utilizing Self–Controlled Movements", 1998, Proceedings of NN98, 5 pp.

Kruger, N., et al, "Object Recognition with a Sparse and Autonomously Learned Representation Based on Banana Wavelets", *Internal Report 96–11*, Institut fur Neuroinformatik, Dec. 96, pp. 1–24.

Kruger, N., et al, "Object Recognition with Banana Wavelets", European Symposium on Artificial Neural Networks (ESANN97), 1997, 6 pp.

Kruger, N., "An Algorithm for the Learning of Weights in Discrimination Functions Using a priori Constraints", *IEEE Transactions on Pattern Analysis and Machine Intelligence*, vol. 19, No. 7, Jul. 1997, pp. 764–768.

Lades, M., et al, "Distortion Invarient Object Recognition in the Dynamic Link Architecture", *IEEE Transactions on Computers*, vol. 42, No. 3, 1993, 11 pp.

Luong, Q. T., et al, "The Fundamental Matrix, Theory, Algorithm, and Stability Analysis", *INRIA*, 193, pp. 1–46.

Manjunath, B. S., et al, "A Feature Based Approach to Face Recognition", In Proceedings IEEE Conference on Computer Vision and Pattern Recognition, pp. 373–378, 3/92.

Mauer, T., et al, "Single–View Based Recognition of Faces Rotated in Depth", In Proceedings of the International Workshop on Automatic Face and Gesture Recognition, pp. 248–253, Zurich, CH, Jun. 26, 1995.

Mauer, T., et al, "Learning Feature Transformations to Recognize Faces Rotated in Depth", In Proceedings of the International Conference on Artificial Neural Networks, vol. 1, pp. 353–358, Paris, France, Oct. 9–13,1995.

Mauer, T., et al, "Tracking and Learning Graphs and Pose on Image Sequences of Faces", Proceedings of 2nd International Conference on Automatic Face and Gesture Recognition, Oct. 14–16, 1996, pp. 176–181.

Maybank, S. J., et al, "A Theory of Self–Calibration of a Moving Camera", *International Journal of Computer Vision*, 8(2), pp. 123–151, 1992.

McKenna, S.J., et al, Tracking Facial Feature Points With Gabor Wavelets and Shape Models, (publication & date unknown), 6 pp.

Okada, K., et al, "The Bochum/USC Face Recognition System", 19 pp. (publication & date unknown).

Okutomi, M., et al, "A Multiple–Baseline Stereo", *IEEE Trans. on Pattern Analysis and Machine Intelligence*, vol. 15, No. 4, pp. 353–363, Apr. 1993.

Peters, G., et al, "Learning Object Representations by Clustering Banana Wavelet Responses", Tech. Report IR–INI 96–09 , Institut fur Neuroinformatik, Ruhr Universitat, Bochum, 1996, 6 pp.

Phillips, P. J. et al, "The Face Recognition Technology (FERET) Program", Proceedings of Office of National Drug Control Policy, CTAC International Technology Symposium, Aug. 18–22, 1997, 10 pages.

Pighin, F, et al, "Synthesizing Realistic Facial Expressions from Photographs", In SIGGRAPH 98 Conference Proceedings, pp. 75–84, Jul. 1998.

Roy, S., et al, "A Maximum Flow Formulation of the N–Camera Stereo Correspondence Problem", IEEE, Proceedings of International Conference on Computer Vision, Bombay, India, Jan. 1998, pp. 1–6.

Sara, R., et al, "On Occluding Contour Artifacts in Stereo Vision", IEEE, Proceedings of International Conference Computer Vision and Pattern Recognition, Puerto Rico, 1997, 6 pp.

Steffens, J., et al, "PersonSpotter—Fast and Robust System for Human Detection, Tracking, and Recognition", Proceedings of International Conference on Automatic Face and Gesture Recognition, 6 pp., Japan–Apr. 1998.

Theimer, W. M., et al, "Phase–Based Binocular Vergence Control and Depth Reconstruction using Active Vision", *CVGIP: Image Understanding*, vol. 60, No. 3, Nov. 1994, pp. 343–358.

Tomasi, C., et al., "Stereo Without Search", Proceedings of European Conference on Computer Vision, Cambridge, UK, 1996, 14 pp. (7 sheets).

Triesch, J., et al, "Robust Classification of Hand Postures Against Complex Backgrounds", Proceedings of the Second International Conference on Automatic Face and Gesture Recognition, Killington, VT, Oct. 1996, 6 pp.

Turk, M., et al, "Eigenfaces for Recognition", *Journal of Cognitive Neuroscience*, vol. 3, No. 1, pp. 71–86, 1991.

Wiskott, L., et al, "Face Recognition and Gender Determination", Proceedings of International Workshop on Automatic Face and Gesture Recognition, pp. 92–97, Zurich CH, Jun. 26, 1995.

Wiskott, L., et al, "Face Recognition by Elastic Bunch Graph Matching", *Internal Report*, IR–INI 96–08, Institut fur Neuroinformatik, Ruhr–Universitat, Bochum, pp. 1–21, Apr. 1996.

Wiskott, L., "Labeled Graphs and Dynamic Link Matching for Face Recognition and Scene Analysis", Verlag Harri Deutsch, Thun–Frankfurt am Main. Reihe Physik, Dec. 1995, pp. 1–109.

Wiskott, L., "Phanton Faces for Face Analysis", Proceedings of 3rd Joint Symposium on Neural Computation, Pasadena, CA, vol. 6, pp. 46–52, Jun. 1996.

Wiskott, L., "Phanton Faces for Face Analysis", Internal Report, IR–INI 96–06, Institut fur Neoroinformatik, Ruhr–Universitat, Bochum, Germany, Apr. 1996, 12 pp.

Wiskott, L., et al, "Face Recognition by Elastic Bunch Graph Matching", *IEEE Transactions on Pattern Analysis and Machine Intelligence*, 19(7), pp. 775–779, 1997.

Wong, R., et al, "PC–Based Human Face Recognition System", *IEEE*, pp. 641–644, 1992.

Wurtz, R., et al, "Corner Detection in Color Images by Multiscale Combination of End–stopped Cortical Cells", *Artificial Neural Networks—ICANN '97*, Lecture Notes in Computer Science, vol. 1327, pp. 901–906, Springer–Verlag, 1997.

Yao, Y., et al, "Tracking a Dynamic Set of Feature Points", *IEEE Transactions on Image Processing*, vol. 4, No. 10, Oct., 1995, pp. 1382–1394.

* cited by examiner

FACE RECOGNITION FROM VIDEO IMAGES

CROSS-REFERENCES TO RELATED APPLICATIONS

This application claims priority under 35 U.S.C. §119(e)(1) and 37 C.F.R. §1.78(a)(4) to U.S. provisional application serial number 60/081,615 filed Apr. 13, 1998 and titled VISION ARCHITECTURE TO DESCRIBE FEATURES OF PERSONS.

FIELD OF THE INVENTION

The present invention relates to vision-based object detection and tracking, and more particularly, to systems for detecting objects in video images, such as human faces, and tracking and identifying the objects in real time.

BACKGROUND OF THE INVENTION

Recently developed object and face recognition techniques include the use of elastic bunch graph matching. The bunch graph recognition technique is highly effective for recognizing faces when the image being analyzed is segmented such that the face portion of the image occupies a substantial portion of the image. However, the elastic bunch graph technique may not reliably detect objects in a large scene where the object of interest occupies only a small fraction of the scene. Moreover, for real-time use of the elastic bunch graph recognition technique, the process of segmenting the image must be computationally efficient or many of the performance advantages of the recognition technique are not obtained.

Accordingly, there exists a significant need for an image processing technique for detecting an object in video images and preparing the video image for further processing by an bunch graph matching process in a computationally efficient manner. The present invention satisfies these needs.

SUMMARY OF THE INVENTION

The present invention is embodied in an apparatus, and related method, for detecting and recognizing an object in an image frame. The object detection process uses robust and computationally efficient techniques. The object identification and recognition process uses an image processing technique based on model graphs and bunch graphs that efficiently represent image features as jets. The system of the invention is particularly advantageous for recognizing a person over a wide variety of pose angles.

In an embodiment of the invention, the object is detected and a portion of the image frame associated with the object is bounded by a bounding box. The bound portion of the image frame is transformed using a wavelet transformation to generate a transformed image. Nodes associated with distinguishing features of the object defined by wavelet jets of a bunch graph generated from a plurality of representative object images are located on the transformed image. The object is identified based on a similarity between wavelet jets associated with an object image in a gallery of object images and wavelet jets at the nodes on the transformed image.

Additionally, the detected object may be sized and centered within the bound portion of the image such that the detected object has a predetermined size and location within the bound portion and background portions of the bound portion of the image frame not associated with the object prior to identifying the object may be suppressed. Often, the object is a head of a person exhibiting a facial region. The bunch graph may be based on a three-dimensional representation of the object. Further, the wavelet transformation may be performed using phase calculations that are performed using a hardware adapted phase representation.

In an alternative embodiment of the invention, the object is in a sequence of images and the step of detecting an object further includes tracking the object between image frames based on a trajectory associated with the object. Also, the step of locating the nodes includes tracking the nodes between image frames and reinitializing a tracked node if the node's position deviates beyond a predetermined position constraint between image frames. Additionally, the image frames may be stereo images and the step of detecting may include detecting convex regions which are associated with head movement.

Other features and advantages of the present invention should be apparent from the following description of the preferred embodiments, taken in conjunction with the accompanying drawings, which illustrate, by way of example, the principles of the invention.

DETAILED DESCRIPTION OF THE PREFERRED EMBODIMENTS

The present invention is embodied in a method, and related apparatus, for detecting and recognizing an object in an image frame. The object may be, for example, a head having particular facial characteristics. The object detection process uses robust and computationally efficient techniques. The object identification and recognition process uses an image processing technique based on model graphs and bunch graphs that efficiently represent image features as jets. The jets are composed of wavelet transforms and are processed at nodes or landmark locations on an image corresponding to readily identifiable features. The system of the invention is particularly advantageous for recognizing a person over a wide variety of pose angles.

Figure 1:
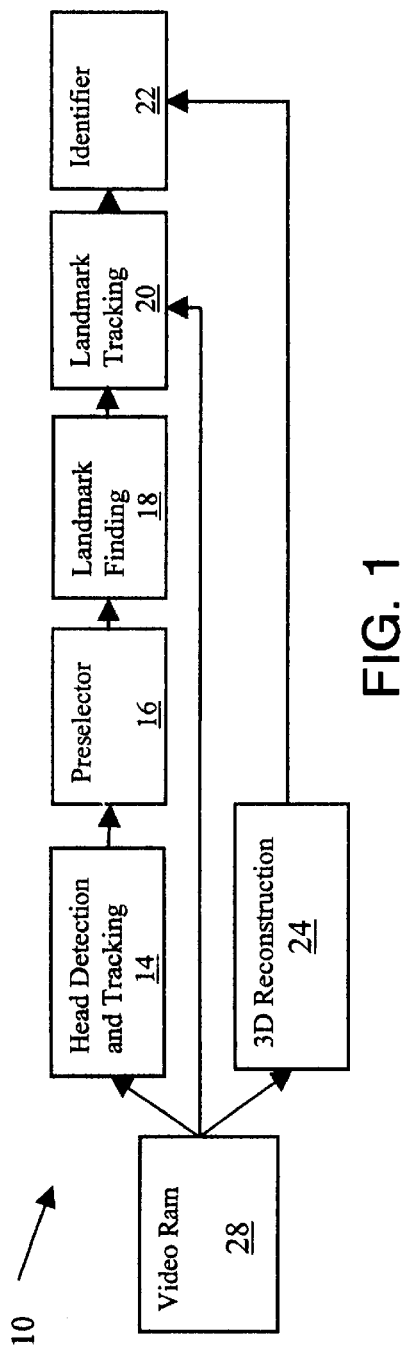
FIG. 1 is a block diagram of a face recognition process, according to the invention.

An image processing system of the invention is described with reference to FIGS. 1–3. The object recognition process 10 operates on digitized video image data provided by an image processing system 12. The image data includes an image of an object class, such as a human face. The image data may be a single video image frame or a series of sequential monocular or stereo image frames.

Before processing a facial image using elastic bunch graph techniques, the head in the image is roughly located, in accordance with the invention, using a head detection and tracking process 14. Depending on the nature of the image data, the head detection module uses one of a variety of visual pathways which are based on, for example, motion, color, or size (stereo vision), topology or pattern. The head detection process places a bounding box around the detected head thus reducing the image region that must be processed by the landmark finding process. Based on data received from the head detection and tracking process, a preselector process 16 selects the most suitable views of the image material for further analysis and refines the head detection to center and scale the head image. The selected head image is provided to a landmark finding process 18 for detecting the individual facial features using the elastic bunch graph technique. Once facial landmarks have been found on the facial image, a landmark tracking process 20 may be used to track of the landmarks. The features extracted at the landmarks are then compared against corresponding features extracted from gallery images by an identifier process 22. This division of the image recognition process is advantageous because the landmark finding process is relatively time-consuming and often may not be performed in real time on a series of image frames having a relatively high frame rate. Landmark tracking, however, on the other hand, may be performed faster than frame rate. Thus, while the initial landmark finding process is occurring, a buffer may be filled with new incoming image frames. Once the landmarks are located, landmark tracking is started and the processing system may catch up by processing the buffered images is until the buffer is cleared. Note that the preselector and the landmark tracking module may be omitted from the face recognition process.

Figure 3:
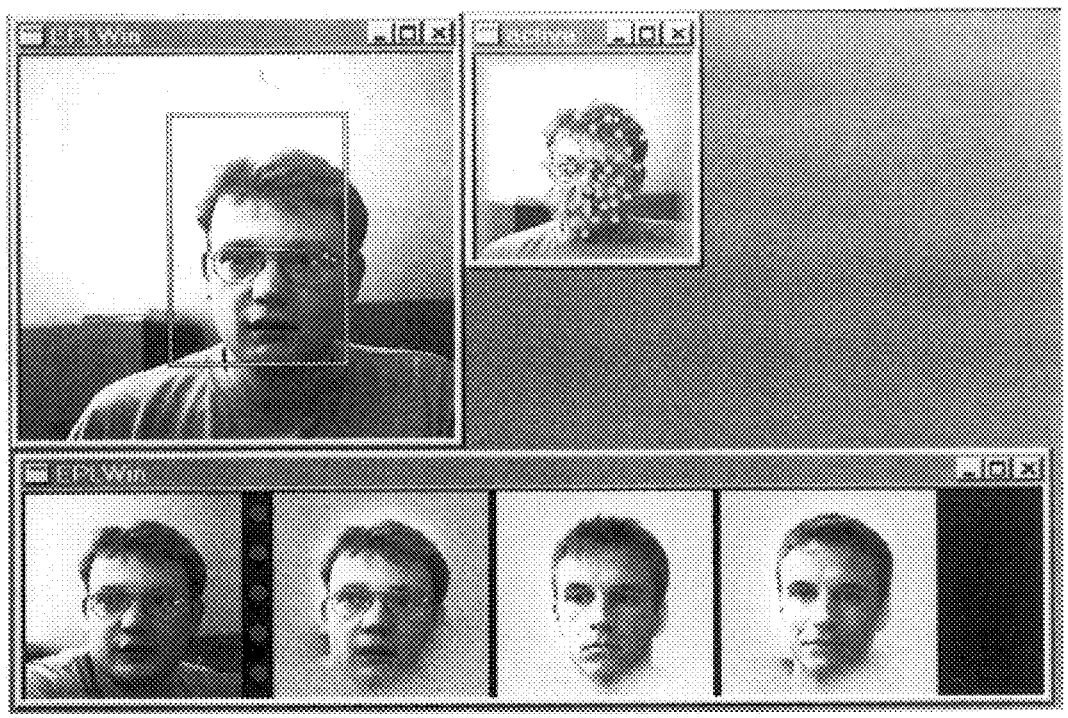
FIG. 3 is a series of images for showing detection, finding and identification processes of the recognition process of FIG. 1.

Screen output of the recognition process is shown in FIG. 3 for the detection, landmark finding and identifier processes. The upper left image window shows an acquired image with the detected head indicated by a bounding rectangle. The head image is centered, resized, and provided to the landmark finding process. The upper right image window shows the output of the landmark finding module with the facial image marked with nodes on the facial landmarks. The marked image is provided to the identified process which is illustrated in the lower window. The left-most image represents the selected face provided by the landmark finding process for identification. The three right-most images represent the most similar gallery images sorted in the order of similarity with the most similar face being in the left-most position. Each gallery image carries a tag (e.g., id number and person name) associated with the image. The system then reports the tag associated with the most similar face.

The face recognition process may be implemented using a three dimensional (3D) reconstruction process 24 based on stereo images. The 3D face recognition process provides viewpoint independent recognition.

Figure 2:
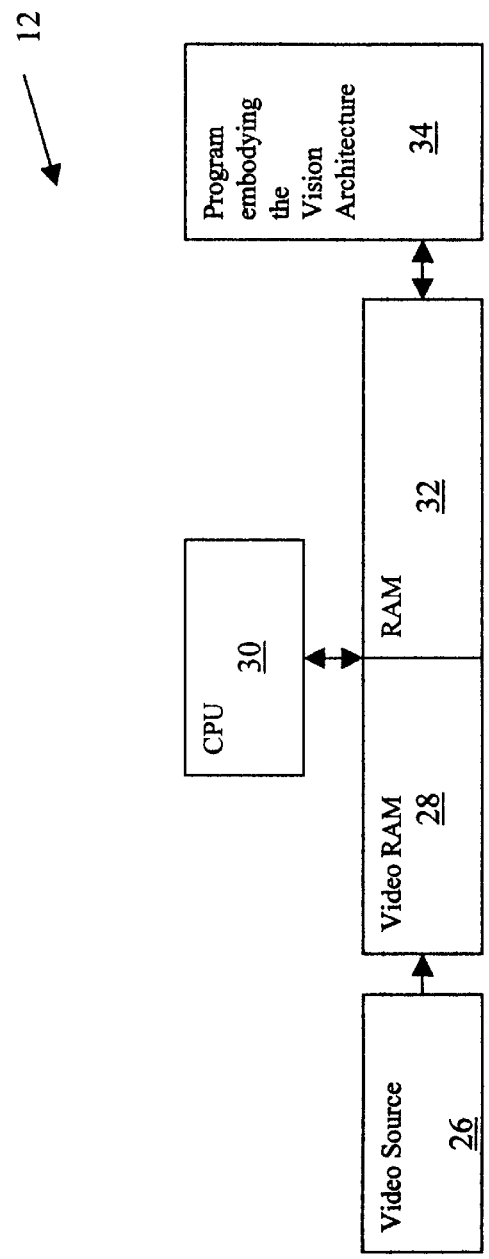
FIG. 2 is a block diagram of a face recognition system, according to the invention.

The image processing system 12 for implementing the face recognition processes of the invention is shown in FIG. 2. The processing system receives a person's image from a video source 26 which generates a stream of digital video image frames. The video image frames are transferred into a video random-access memory (VPAM) 28 for processing. A satisfactory imaging system is the Matrox Meteor II available from Matrox™ (Dorval, Quebec, Canada; www.matrox.com) which generates digitized images produced by a conventional CCD camera and transfers the images in real-time into the memory at a frame rate of 30 Hz. A typical resolution for an image frame is 256 pixels by 256 pixels. The image frame is processed by an image processor having a central processing unit (CPU) 30 coupled to the VRAM and random-access memory (RAM) 32. The RAM stores program code 34 and data for implementing the facial recognition processes of the invention. Alternatively, the image processing system may be implemented in application specific hardware.

Figure 4:
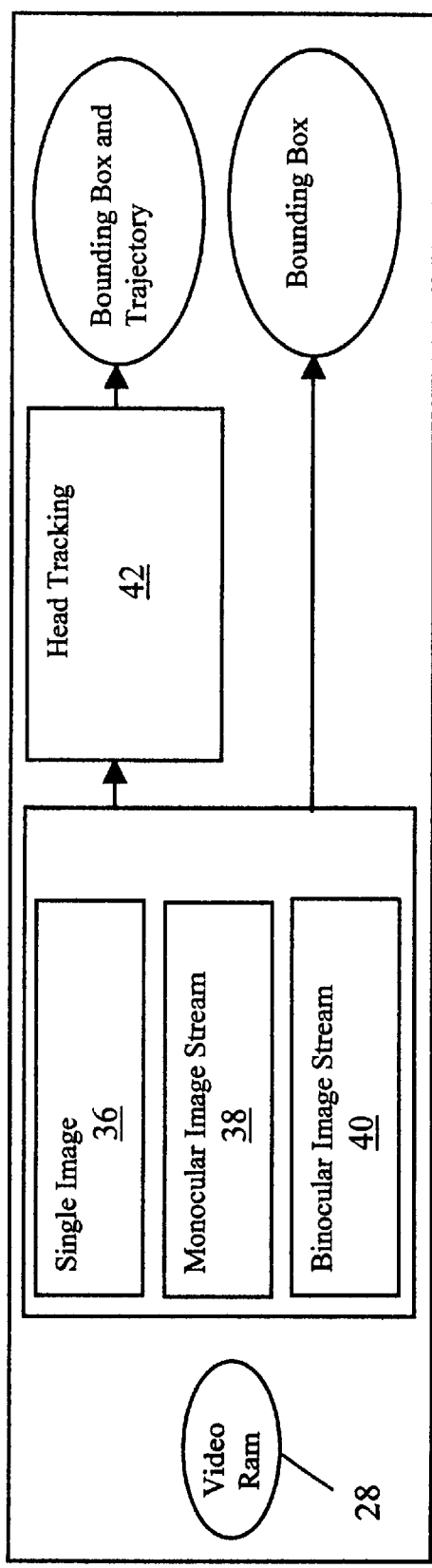
FIG. 4 is a block diagram of the head detection and tracking process, according to the invention.

The head detection process is described in more detail with reference to FIG. 4. The facial image may be stored in VRAM 28 as a single image 36, a monocular video stream of images 38 or a binocular video stream of images 40.

For a single image, processing time may not be critical and elastic bunch graph matching, described in more detail below, may be used to detect a face if the face covers at least 10% of the image and has a diameter of at least 50 pixels. If the face is smaller than 10% of the image or if multiple faces are present, a neural network based face detector may be use as described in H. A. Rowley, S. Baluja and T. Kanade, "Rotation Invarient Neural Network-Based Face Detection", Proceedings Computer Vision and Pattern Recognition, 1998. If the image includes color information, a skin color detection process may be used to increase the reliability of the face detection. The skin color detection process may be based on a look-up table that contains possible skin colors. Confidence values which indicate the reliability of face detection and which are generated during bunch graph matching or by the neural network, may be increased for skin-colored image regions.

A monocular image stream of at least 10 frames per second may be analyzed for image motion, particularly if the image stream includes only a single person that is moving in front of a stationary background. One technique for head tracking involves the use of difference images to determine which regions of an image have been moving.

As described in more detail below with respect to binocular images, head motion often results in a difference image having a convex regions within a motion silhouette. This motion silhouette technique can readily locate and track head motion if image includes a single person in an upright position in front of a static background. A clustering algorithm groups moving regions into clusters. The top of the highest cluster that exceeds a minimal threshold size and diameter is considered the head and marked.

Another advantageous use of head motion detection uses graph matching which is invoked only when the number of pixels affected by image motion exceeds a minimal threshold. The threshold is selected such that the relatively time consuming graph matching image analysis is performed only if sufficient change in the image justifies a renewed indepth analysis. Other techniques for determining convex regions of a noisy motion silhouette may be used such as, for example, Turk et al., "Eignefaces for Recognition", Journal of Cognitive Neuroscience, Vol. 3, No. 1 p. 71, 1991. Optical flow methods, as described in D. J. Fleet, "Measurement of Image Velocity", Kluwer International Series in Engineering and Computer Science, No. 169, 1992, provide an alternative and reliable means to determine which image regions change but are computationally more intensive.

Figure 5:
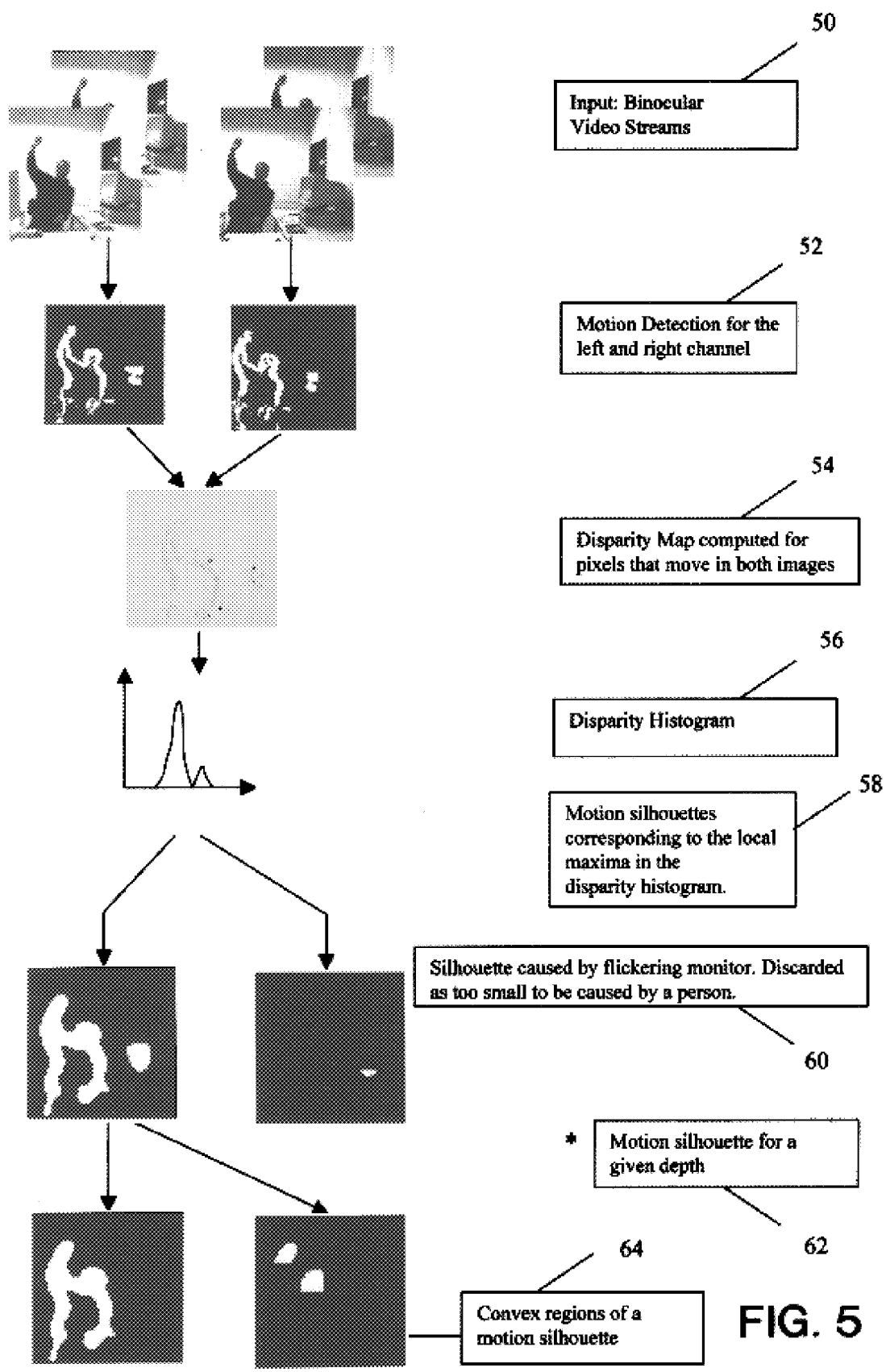
FIG. 5 is a flow chart, with accompanying images, for illustrating a disparity detection process according to the invention.

With reference to FIG. 5, reliable and fast head and face detection is possible using an image stream of stereo binocular video images (block 50). Stereo vision allows for discrimination between foreground and background objects and it allows for determining object size for objects of a known size, such as heads and hands. Motion is detected between two images in an image series by applying a difference routine to the images in both the right image channel and the left image channel (block 52). A disparity map is computed for the pixels that move in both image channels (block 54). The convex detector next uses disparity histograms (block 56) that show the number of pixels against the disparity. The image regions having a disparity confined to a certain disparity interval are selected by inspecting the local maxima of the disparity histogram (block 58). The pixels associated with a local maxima are referred to as motion silhouettes. The motion silhouettes are binary images.

Some motion silhouettes may be discarded as too small to be generated by a person (block 60). The motion silhouette associated with a given depth may distinguish a person from other moving objects (block 62).

Figure 6:
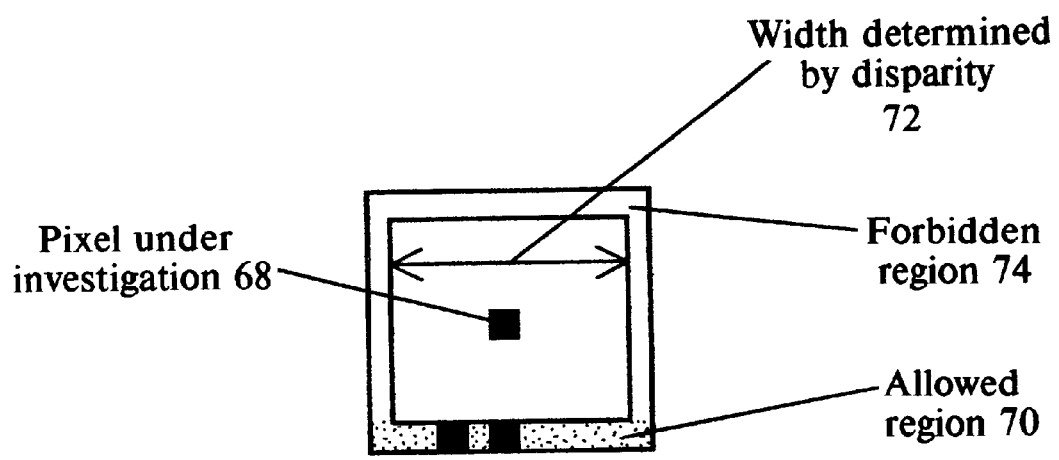
FIG. 6 is a schematic diagram of a convex detector, according to the invention.

The convex regions of the motion silhouette (block 64) are detected by a convex detector as shown in FIG. 6. The convex detector analyzes convex regions within the silhouettes. The convex detector checks whether a pixel 68 that belongs to a motion silhouette having neighboring pixels that are within an allowed region 70 on the circumference or width of the disparity 72. The connected allowed region can be located in any part of the circumference. The output of the convex detector is a binary value.

Skin color silhouettes may likewise be used for detecting heads and hands. The motion silhouettes, skin color silhouettes, outputs of the convex detectors applied to the motion silhouettes and outputs of the convex detectors applied to the skin color silhouettes, provide four different evidence maps. An evidence map is a scalar function over the image domain that indicates the evidence that a certain pixel belongs to a face or a hand. Each of the four evidence maps is binary valued. The evidence maps are linearly superimposed for a given disparity and checked for local maxima. The local maxima indicate candidate positions where heads or hands might be found. The expected diameter of a head then may be inferred from the local maximum in the disparity map that gave rise to the evidence map. Head detection as described performs well even in the presence of strong background motion.

Figure 7:
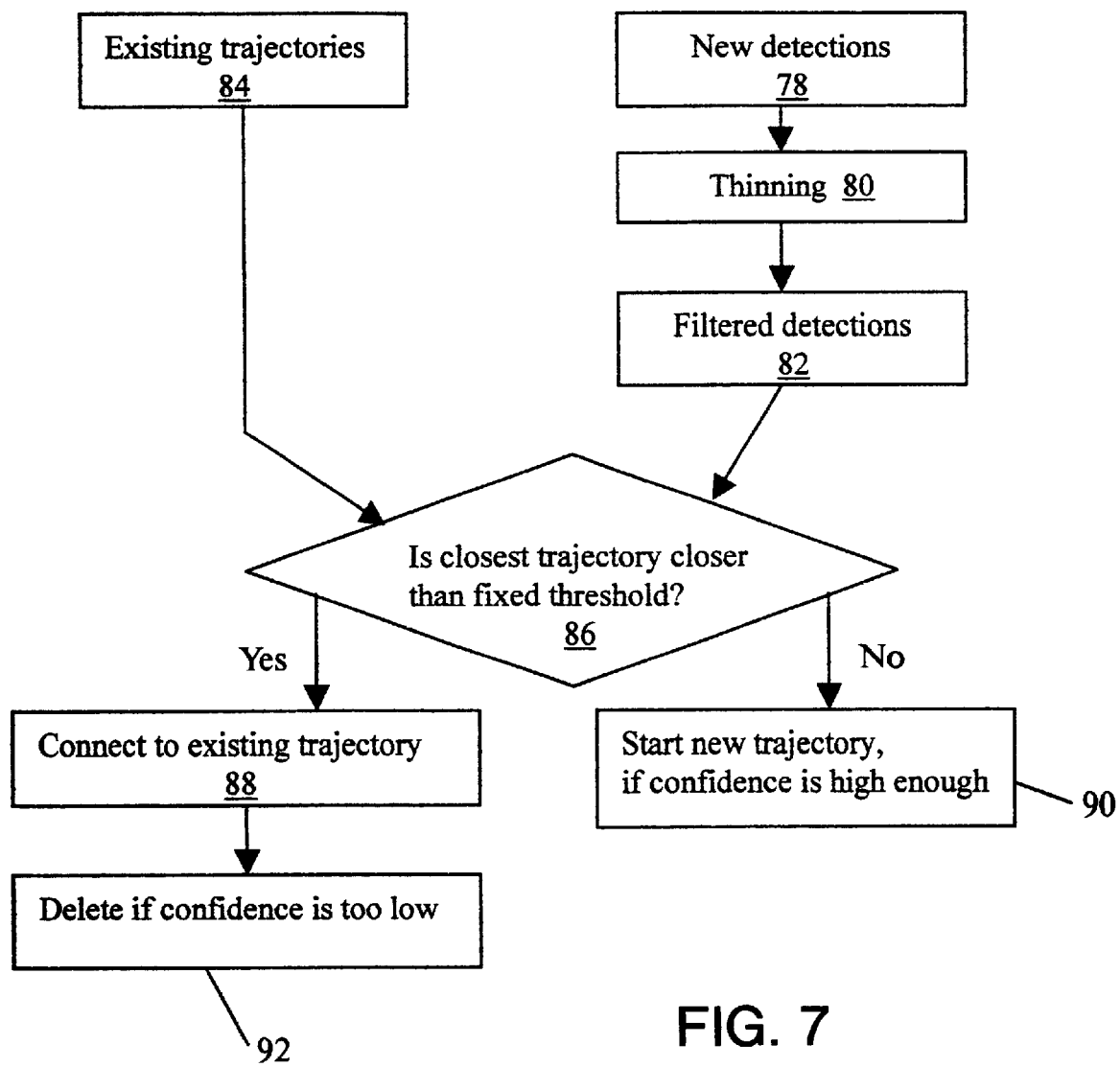
FIG. 7 is a flow chart of a head tracking process, according to the invention.

The head tracking process (block 42) generates head position information that may be used to generate head trajectory checking. As shown in FIG. 7, newly detected head positions (block 78) may be compared with existing head trajectories. A thinning (block 80) takes place that replaces multiple nearby detections by a single representative detection (block 82). The new position is checked to determine whether the new estimated position belongs to an already existing trajectory (block 84) assuming spatiotemporal continuity. For every position estimate found for the frame acquired at time t, the algorithm looks (block 86) for the closest head position estimate that was determined for the previous frame at time t-1 and connects it (block 88). If an estimate that is sufficiently close can not be found, it is assumed that a new head appeared (block 90) and a new trajectory is started. To connect individual estimates to trajectories, only image coordinates are used.

Every trajectory is assigned a confidence which is updated using a leaky integrator. If the confidence value falls below a predetermined threshold, the trajectory is deleted (block 92). A hysteresis mechanism is used to stabilize trajectory creation and deletion. In order to initiate a trajectory (block 90), a higher confidence value must to be reached than is necessary to delete a trajectory.

The preselector 16 (FIG. 2) operates to select suitable images for recognition from a series of images belonging to the same trajectory. This selection is particularly useful if the computational power of the hardware is not sufficient to analyze each image of a trajectory individually. However, if available computation power is sufficient to analyze all faces found it may not be necessary to employ the preselector.

The preselector 16 receives input from the head tracking process 14 and provides output to the landmark finding process 18. The input may be:

A monocular gray value image of 256×256 pixel size represented by a 2 dimensional array of bytes.

An integer number representing the sequence number of the image. This number is the same for all images belonging to the same sequence.

Four integer values representing the pixel coordinates of the upper left and lower right corners of a square-shaped bounding rectangle that surrounds the face.

The preselector's output may be:

Selected monocular gray value image from the previous sequence.

Four integer values representing the pixel coordinates of the upper left and lower right corners of a square-shaped bounding rectangle that represents the face position in a more accurate way compared to the rectangle that Preselector accepts as input.

Figure 8:
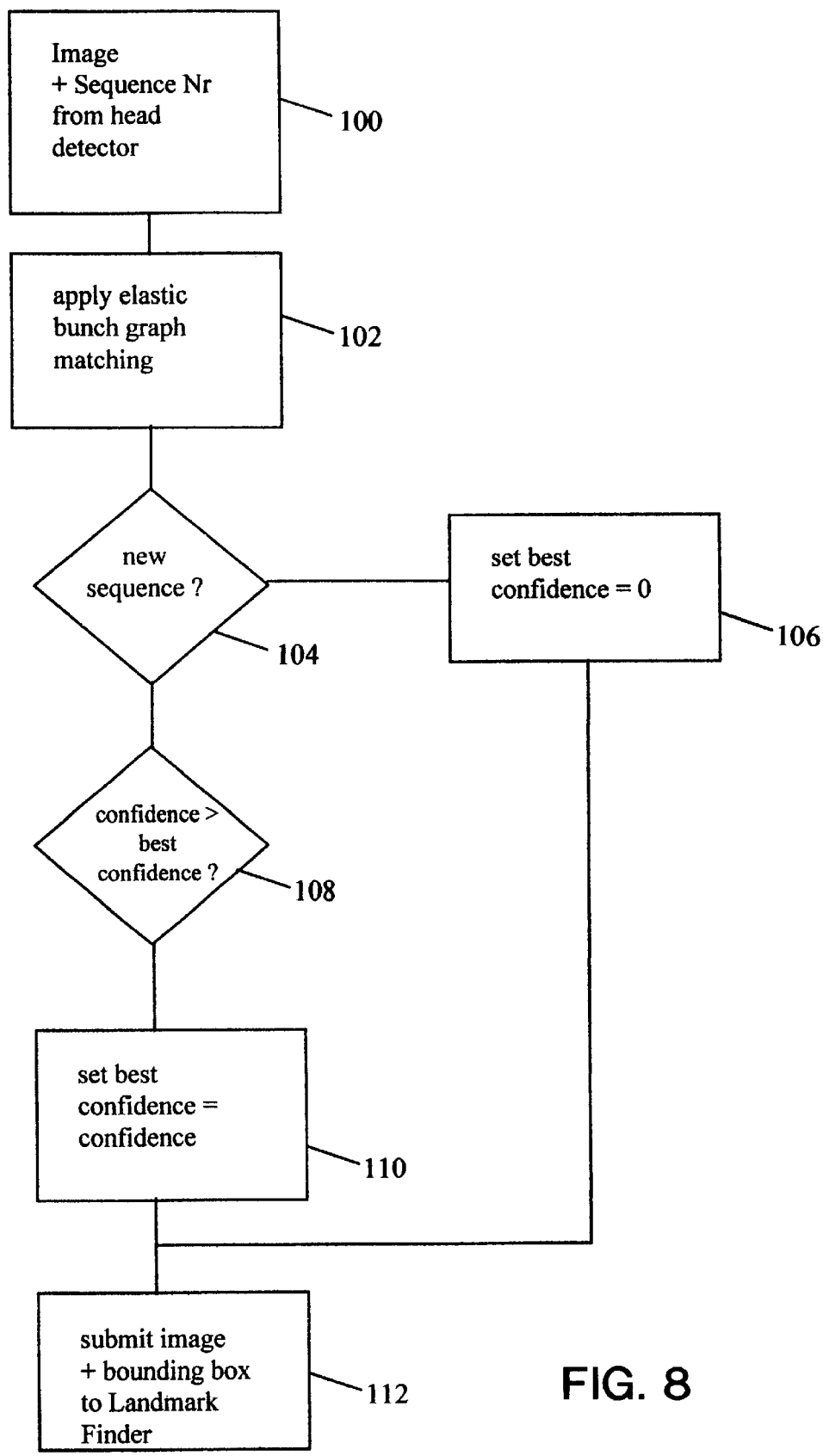
FIG. 8 is a flow chart of a preselector, according to the invention.

As shown in FIG. 8, the preselector 16 processes a series of face candidates that belong to the same trajectory as determined by the head tracking process 14 (block 100). Elastic bunch graph matching, as described below with respect to landmark finding, is applied (block 102) to this sequence of images that contain an object of interest (e.g. the head of a person) in order to select the most suitable images for further processing (i.e. Landmark finding/Recognition). The preselector applies graph matching in order to evaluate each image by quality. Additionally, the matching result provides more accurate information about the position and size of the face than the head detection module. Confidence values generated by the matching procedure are used as a measure of suitability of the image. Preselector submits an image to the next module if its confidence value exceeds the best confidence value measured so far in the current sequence (block 104–110). The preselector bounds the detected image by a bounding box and provides the image to the landmark finding process 18. The subsequent process starts processing on each incoming image but terminates if an image having a higher confidence value (measured by the preselector) comes from within the same sequence. This may lead to increased CPU workload but yields preliminary results faster.

Accordingly, the Preselector filters out a set of most suitable images for further processing. The preselector may alternatively evaluate the images as follows:

The subsequent modules (e.g. landmarker, identifier) wait until the sequence has finished in order to select the last and therefore most promising image approved by preselector. This leads to low CPU workload but implies a time delay until the final result (e.g. recognition) is available.

The subsequent modules take each image approved by preselector, evaluate it individually, and leave final selection to the following modules (e.g. by recognition confidence). This also yields fast preliminary results. The final recognition result in this case may change within one sequence, yielding in the end better recognition rate. However, this approach requires the most amount of CPU time among the three evaluation alternatives.

Figure 9:
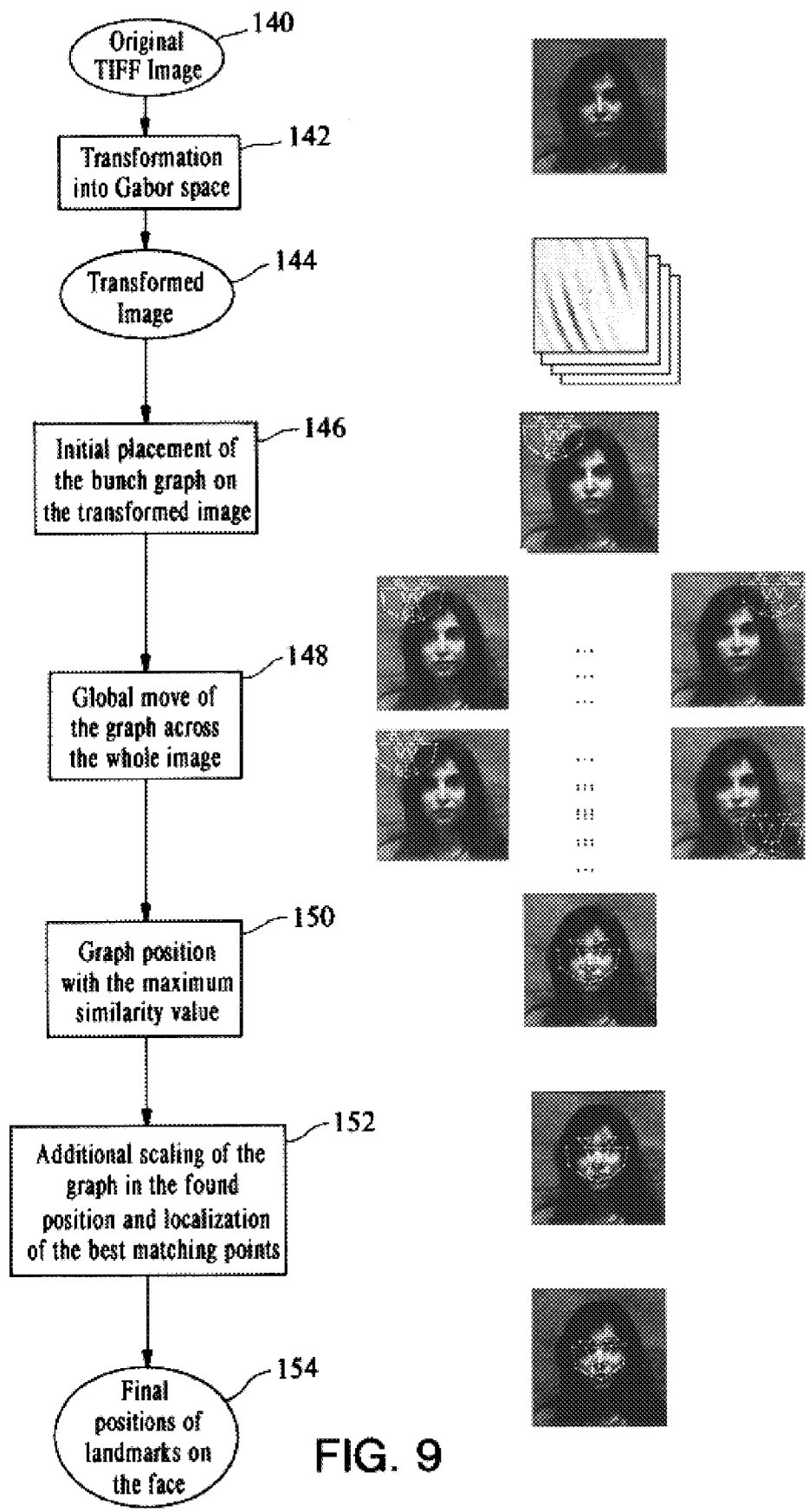
FIG. 9 is a flow chart, with accompanying photographs, for illustrating a landmark finding technique of the facial recognition apparatus and system of FIG. 1.

The facial landmarks and features of the head may be located using an elastic graph matching technique shown in FIG. 9. In the elastic graph matching technique, a captured image (block 140) is transformed into Gabor space using a wavelet transformation (block 142) which is described below in more detail with respect to FIG. 10. The transformed image (block 144) is represented by 40 complex values, representing wavelet components, per each pixel of the original image. Next, a rigid copy of a model graph, which is described in more detail below with respect to FIG. 12, is positioned over the transformed image at varying model node positions to locate a position of optimum similarity (block 146). The search for the optimum similarity may be performed by positioning the model graph in the upper left hand corner of the image, extracting the jets at the nodes, and determining the similarity between the image graph and the model graph. The search continues by sliding the model graph left to right starting from the upper-left corner of the image (block 148). When a rough position of the face is found (block 150), the nodes are individually allowed to move, introducing elastic graph distortions (block 152). A phase-insensitive similarity function, discussed below, is used in order to locate a good match (block 154). A phase-sensitive similarity function is then used to locate a jet with accuracy because the phase is very sensitive to small jet displacements. The phase-insensitive and the phase-sensitive similarity functions are described below with respect to FIGS. 10–13. Note that although the graphs are shown in FIG. 9 with respect to the original image, the model graph movements and matching are actually performed on the transformed image.

Figure 10:
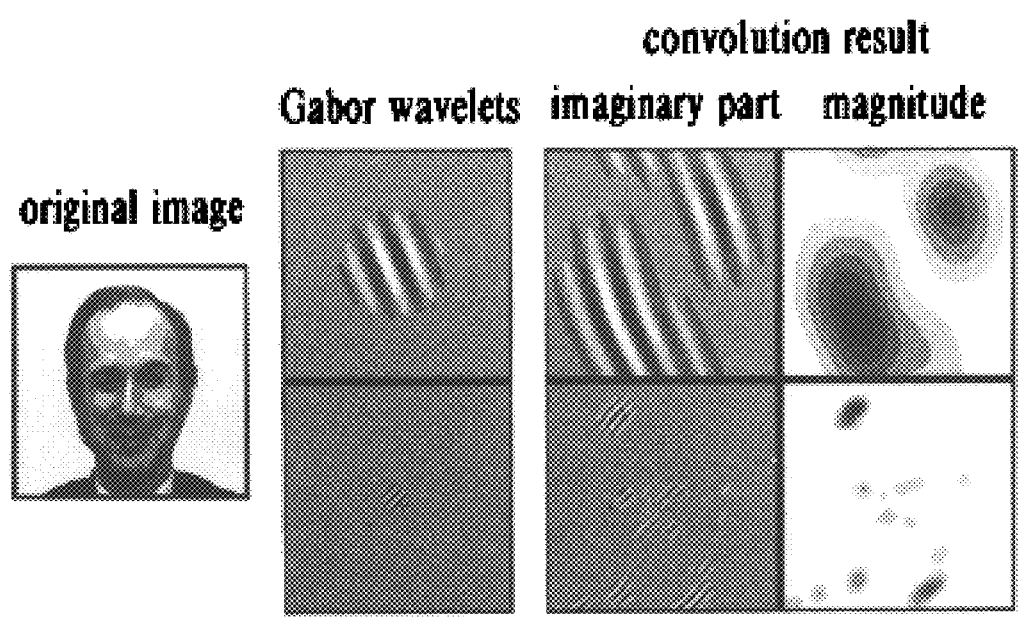
FIG. 10 is a series of images showing processing of a facial image using Gabor wavelets, according to the invention.

The wavelet transform is described with reference to FIG. 10. An original image is processed using a Gabor wavelet to generate a convolution result. The Gabor-based wavelet, consists of a two-dimensional complex wave field modulated by a Gaussian envelope.

$$\psi_{\vec{k}}(x) = \frac{k^2}{\sigma^2} e^{-x^2 \frac{k^2}{2\sigma^2}} \left\{ e^{i\vec{k}\vec{x}} - e^{-\frac{\sigma^2}{2}} \right\} \quad (1)$$

The wavelet is a plane wave with wave vector $\vec{k}$ restricted by a Gaussian window, the size of which relative to the wavelength is parameterized by $\sigma$. The term in the brace removes the DC component. The amplitude of the wavevector k may be chosen as follows where v is related to the desired spacial resolutions.

$$k_v = 2^{-\frac{v+2}{2}} \pi, v = 1, 2, \ldots \quad (2)$$

A wavelet, centered at image position $\vec{x}$ is used to extract the wavelet component $J_{\vec{k}}$ from the image with gray level distribution $I(\vec{x})$, $$J_{\vec{k}}(\vec{X}) = \int d\vec{x}\,' I(\vec{x}\,') \psi_{\vec{k}}(\vec{x} - \vec{x}\,') \quad (3)$$

The space of wave vectors $\vec{k}$ is typically sampled in a discrete hierarchy of 5 resolution levels (differing by half-octaves) and 8 orientations at each resolution level (See e.g. FIG. 13), thus generating 40 complex values for each sampled image point (the real and imaginary components referring to the cosine and sine phases of the plane wave). The samples in k-space are designated by the index j=1, . . . ,40 and all wavelet components centered in a single image point are considered as a vector which is called a jet 60. Each jet describes the local features of the area surrounding $\vec{x}$. If sampled with sufficient density, the image may be reconstructed from jets within the bandpass covered by the sampled frequencies. Thus, each component of a jet is the filter response of a Gabor wavelet extracted at a point (x, y) of the image.

Figure 11:
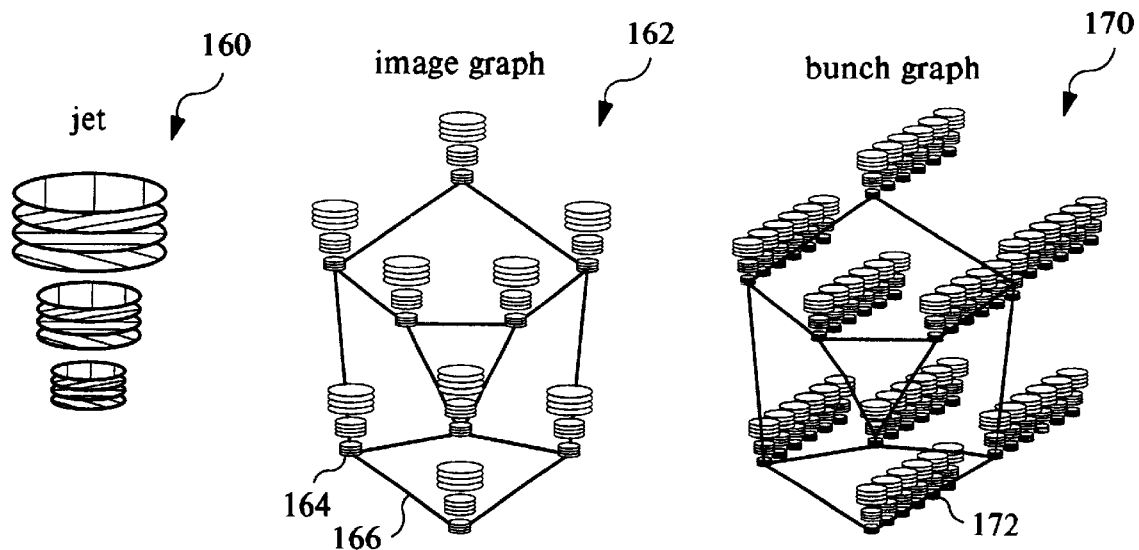
FIG. 11 is a series of graphs showing the construction of a jet, image graph, and bunch graph using the wavelet processing technique of FIG. 10, according to the invention.
Figure 12:
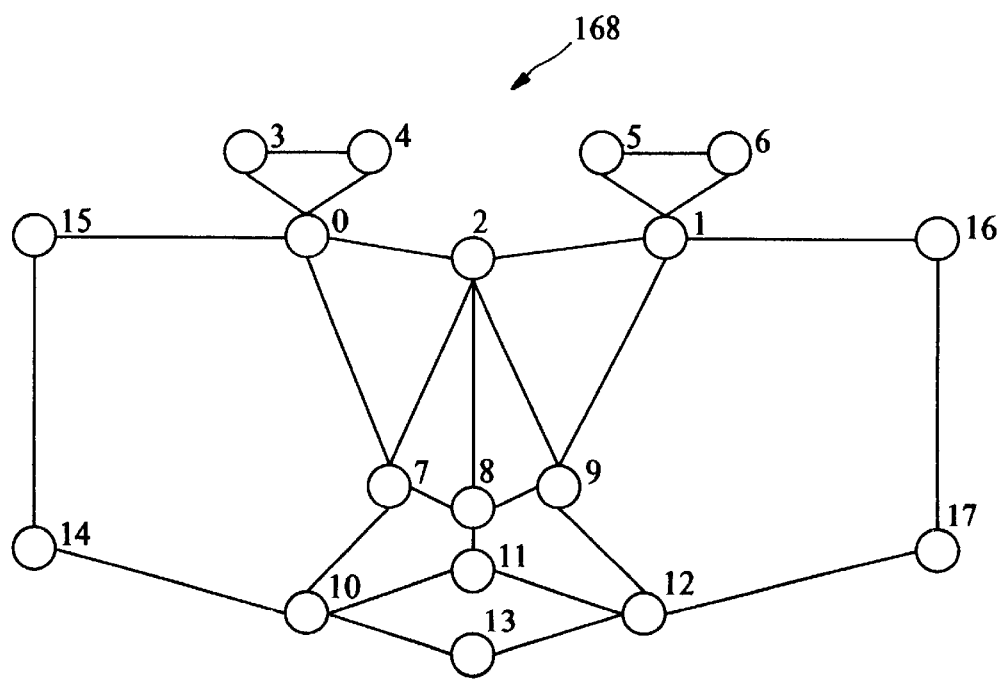
FIG. 12 is a diagram of an model graph, according to the invention, for processing facial images.
Figure 13:
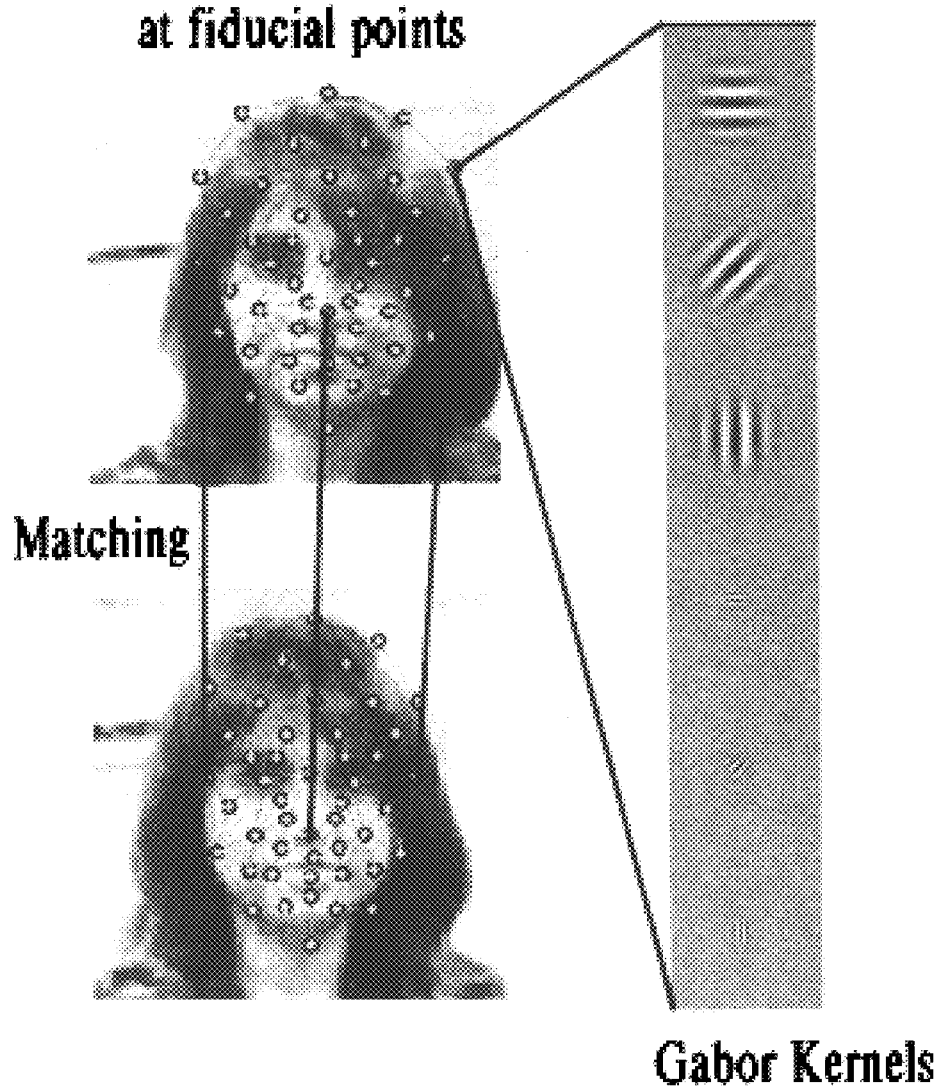
FIG. 13 includes two diagrams showing the use of wavelet processing to locate facial features.

A labeled image graph 162, as shown in FIG. 11, is used to describe the aspects of an object (in this context, a face). The nodes 164 of the labeled graph refer to points on the object and are labeled by jets 160. Edges 166 of the graph are labeled with distance vectors between the nodes. Nodes and edges define the graph topology. Graphs with equal geometry may be compared. The normalized dot product of the absolute components of two jets defines the jet similarity. This value is independent of the illumination and contrast changes. To compute the similarity between two graphs, the sum is taken over similarities of corresponding jets between the graphs.

A model graph 168 that is particularly designed for finding a human face in an image is shown in FIG. 12. The numbered nodes of the graph have the following locations:

0 right eye pupil
1 left eye pupil
2 top of the nose
3 right corner of the right eyebrow
4 left corner of the right eyebrow
5 right corner of the left eyebrow
6 left corner of the left eyebrow
7 right nostril
8 tip of the nose
9 left nostril
10 right corner of the mouth
11 center of the upper lip
12 left corner of the mouth
13 center of the lower lip
14 bottom of the right ear
15 top of the right ear
16 top of the left ear
17 bottom of the left ear To represent a face, a data structure called bunch graph 170 is used. It is similar to the graph described above, but instead of attaching only a single jet to each node, a whole bunch of jets 172 (a bunch jet) are attached to each node. Each jet is derived from a different facial image. To form a bunch graph, a collection of facial images (the bunch graph gallery) is marked with node locations at defined positions of the head. These defined positions are called landmarks. When matching a bunch graph to an image, each jet extracted from the image is compared to all jets in the corresponding bunch attached to the bunch graph and the best-matching one is selected. This matching process is called elastic bunch graph matching. When constructed using a judiciously selected gallery, a bunch graph covers a great variety of faces that may have significant different local properties.

In order to find a face in an image frame, the graph is moved and scaled over the image frame until a place is located at which the graph matches best (the best fitting jets within the bunch jets are most similar to jets extracted from the image at the current positions of the nodes). Since face features differ from face to face, the graph is made more general for the task, e.g., each node is assigned with jets of the corresponding landmark taken from 10 to 100 individual faces.

If the graphs have relative distortion, a second term that accounts for geometrical distortions may be introduced. Two different jet similarity functions are used for two different, or even complementary, tasks. If the components of a jet $\vec{J}$ are written in the form with amplitude $a_j$ and phase $\phi_j$, the similarity of two jets $\vec{J}$ and $\vec{J}'$ is the normalized scalar product of the amplitude vector:

$$S(\vec{J}, \vec{J}') = \frac{\sum a_j a_j'}{\sqrt{\sum a_j^2 \sum a_j'^2}} \quad (4)$$

The other similarity function has the form $$S(\vec{J}, \vec{J}') = \frac{\sum a_j a_j' \cos(\phi_j - \phi_j' - \vec{d}\vec{k}_j)}{\sqrt{\sum a_j^2 \sum a_j'^2}} \quad (5)$$

This function includes a relative displacement vector between the image points to which the two jets refer. When comparing two jets during graph matching, the similarity between them is maximized with respect to d, leading to an accurate determination of jet position. Both similarity functions are used, with preference often given to the phase-insensitive version (which varies smoothly with relative position), when first matching a graph, and given to the phase-sensitive version when accurately positioning the jet.

Figure 14:
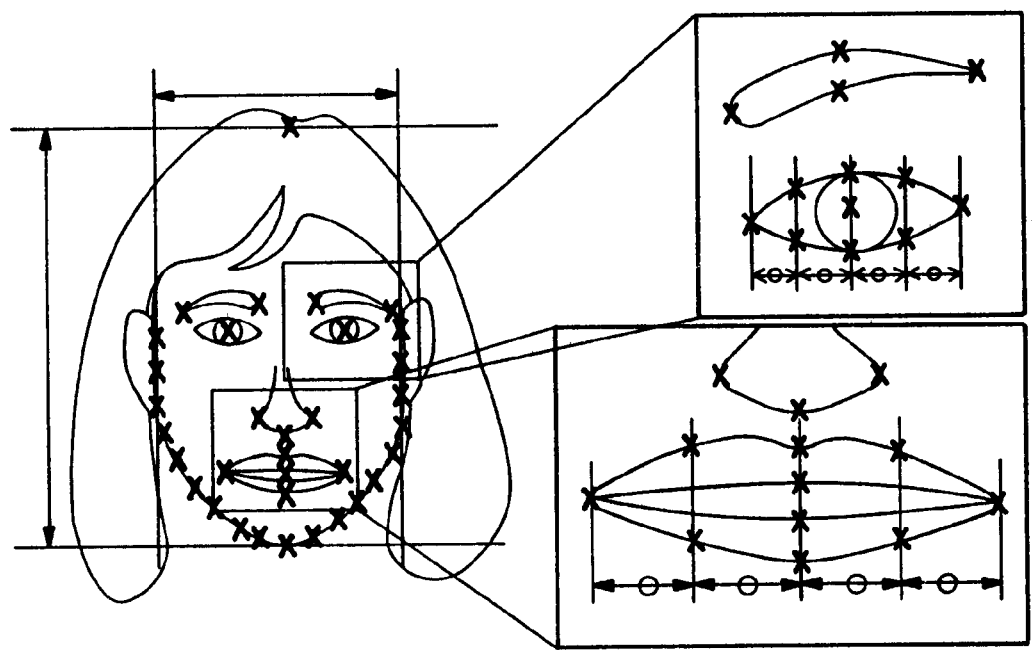
FIG. 14 is a diagram of a face with extracted eye and mouth regions, for illustrating a course-to-fine landmark finding technique.

A course-to-fine landmark finding approach, shown in FIG. 14, uses graphs having fewer nodes and kernel on lower resolution images. After coarse landmark finding has been achieved, higher precision localization may be performed on higher resolution images for precise finding of a particular facial feature.

Figure 15:
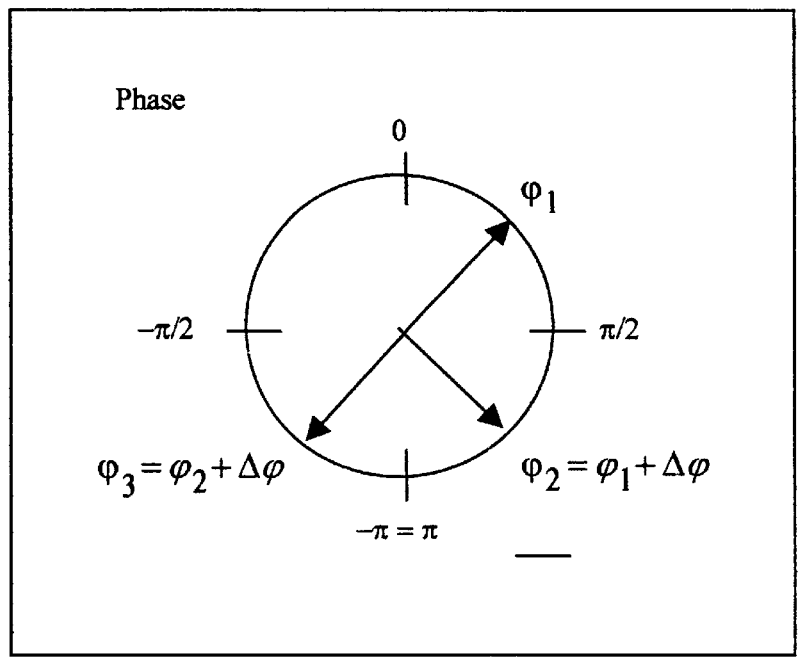
FIG. 15 is a schematic diagram illustrating a circular behavior of phase.

The responses of Gabor convolutions are complex numbers which are usually stored as absolute and phase values because comparing Gabor jets may be performed more efficiently if the values are represented in that domain rather than in the real-imaginary domain. Typically the absolute and phase values are stored as 'float' values. Calculations are then performed using float-based arithmetic. The phase value ranges within a range of $-\pi$ to $\pi$ where $-\pi$ equals $\pi$ so that the number distribution can be displayed on a circular axis as shown in FIG. 15. Whenever the phase value exceeds this range, i.e. due to an addition or subtraction of a constant phase value, the resulting value must be readjusted to within this range which requires more computational effort than the float-addition alone.

Figure 16:
FIG. 16 are schematic diagrams illustrating a two's complement representation of phase having a circular behavior, according to the invention.

The commonly used integer representation and related arithmetic provided by most processors is the two's complement. Since this value has a finite range, overflow or underflow may occur in addition and subtraction operations. The maximum positive number of a 2-byte integer is 32767. Adding 1 yields a number that actually represents -32768. Hence the arithmetic behavior of the two's complement integer is very close to the requirements for phase arithmetic. Therefore, we may represent phase values by 2-byte integers. Phase values j are mapped into integer values I as shown in FIG. 16. The value in the range of $-\pi$ to $\pi$ is rarely required during matching and comparison stages described later. Therefore the mapping between $[-\pi, \pi]$ and $[-32768, 32768]$ does not need to be computed very often. However phase additions and subtractions occur very often. These compute much faster using the processor adapted interval. Therefore this adaptation technique can significantly improve the calculation speed of the processor.

Figure 17:
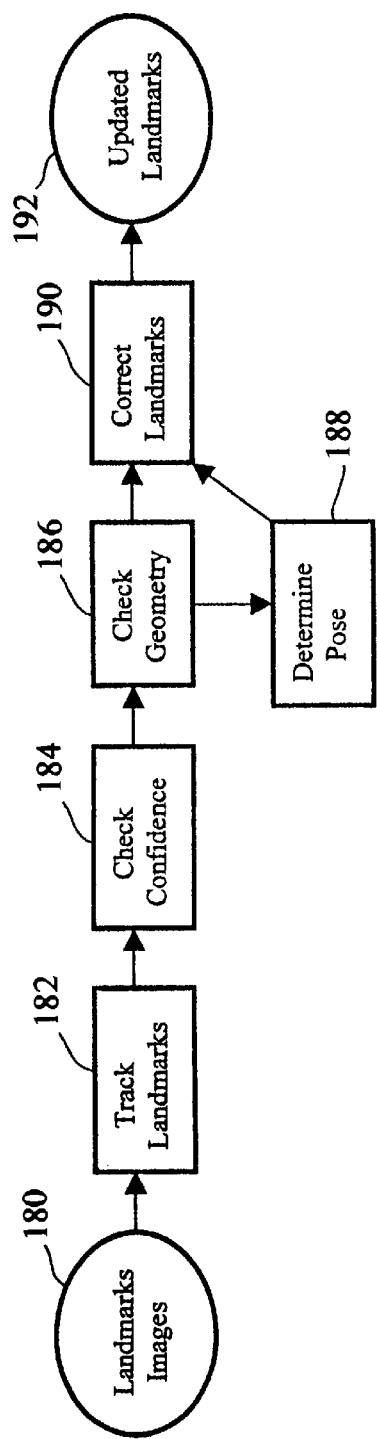
FIG. 17 is a flow diagram showing a tracking technique for tracking landmarks found by the landmark finding technique of the invention.
Figure 18:
FIG. 18 is a series of facial images showing tracking of facial features, according to the invention.

After the facial features and landmarks are located, the facial features may be tracked over consecutive frames as illustrated in FIGS. 17 and 18. The tracking technique of the invention achieves robust tracking over long frame sequences by using a tracking correction scheme that detects whether tracking of a feature or node has been lost and reinitializes the tracking process for that node.

The position X_n of a single node in an image I_n of an image sequence is known either by landmark finding on image I_n using the landmark finding method (block 180) described above, or by tracking the node from image I_(n-1) to I_n using the tracking process. The node is then tracked (block 182) to a corresponding position X_(n+1) in the image I_(n+1) by one of several techniques. The tracking methods described below advantageously accommodate fast motion.

A first tracking technique involves linear motion prediction. The search for the corresponding node position X_(n+1) in the new image I_(n+1) is started at a position generated by a motion estimator. A disparity vector (X_n–X_(n-1)) is calculated that represents the displacement, assuming constant velocity, of the node between the preceeding two frames. The disparity or displacement vector D_n may be added to the position X_n to predict the node position X_(n+1). This linear motion model is particularly advantageous for accommodating constant velocity motion. The linear motion model also provides good tracking if the frame rate is high compared to the acceleration of the objects being tracked. However, the linear motion model performs poorly if the frame rate is too low so that strong acceleration of the objects occurs between frames in the image sequence. Because it is difficult for any motion model to track objects under such conditions, use of a camera having a higher frame rates is recommended.

The linear motion model may generate too large of an estimated motion vector D_n which could lead to an accumulation of the error in the motion estimation. Accordingly, the linear prediction may be damped using a damping factor f_D. The resulting estimated motion vector is D_n=f_D*(X_n-X_(n-1)). A suitable damping factor is 0.9. If no previous frame I_(n-1) exists, e.g., for a frame immediately after landmark finding, the estimated motion vector is set equal to zero (D_n=0).

Figure 19:
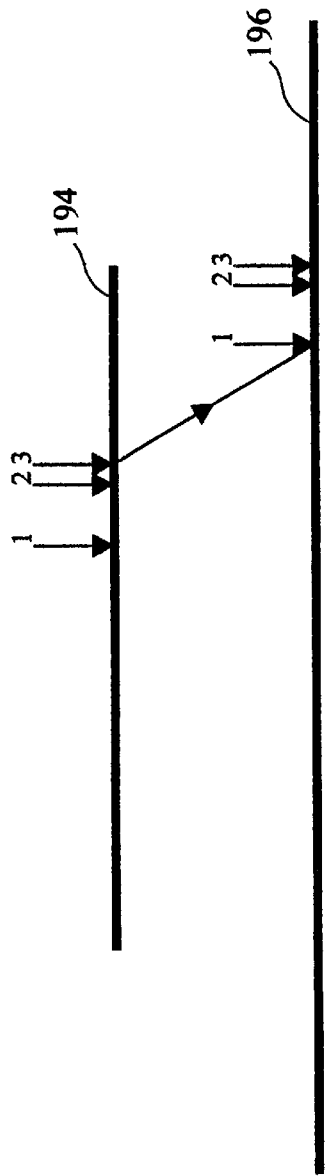
FIG. 19 is a diagram of a gaussian image pyramid technique for illustrating landmark tracking in one dimension.

A tracking technique based on a Gaussian image pyramid, applied to one dimension, is illustrated in FIG. 19. Instead of using the original image resolution, the image is down sampled 2–4 times to create a Gaussian pyramid of the image. An image pyramid of 4 levels results in a distance of 24 pixels on the finest, original resolution level being represented as only 3 pixels on the coarsest level. Jets may be computed and compared at any level of the pyramid.

Tracking of a node on the Gaussian image pyramid is generally performed first at the most coarse level and then preceeding to the most fine level. A jet is extracted on the coarsest Gauss level of the actual image frame I_(n+1) at the position X_(n+1) using the damped linear motion estimation X_(n+1)=(X_n+D_n) as described above, and compared to the corresponding jet computed on the coarsest Gauss level of the previous image frame. From these two jets, the disparity is determined, i.e., the 2D vector R pointing from X_(n+1) to that position that corresponds best to the jet from the previous frame. This new position is assigned to X_(n+1). The disparity calculation is described below in more detail. The position on the next finer Gauss level of the actual image (being 2*X_(n+1)), corresponding to the position X_(n+1) on the coarsest Gauss level is the starting point for the disparity computation on this next finer level. The jet extracted at this point is compared to the corresponding jet calculated on the same Gauss level of the previous image frame. This process is repeated for all Gauss levels until the finest resolution level is reached, or until the Gauss level is reached which is specified for determining the position of the node corresponding to the previous frame's position.

Two representative levels of the Gaussian image pyramid are shown in FIG. 19, a coarser level 194 above, and a finer level 196 below. Each jet is assumed to have filter responses for two frequency levels. Starting at position 1 on the coarser Gauss level, X_(n+1)=X_n+D_n, a first disparity move using only the lowest frequency jet coefficients leads to position 2. A second disparity move by using all jet coefficients of both frequency levels leads to position 3, the final position on this Gauss level. Position 1 on the finer Gauss level corresponds to position 3 on the coarser level with the coordinates being doubled. The disparity move sequence is repeated, and position 3 on the finest Gauss level is the final position of the tracked landmark.

After the new position of the tracked node in the actual image frame has been determined, the jets on all Gauss levels are computed at this position. A stored array of jets that was computed for the previous frame, representing the tracked node, is then replaced by a new array of jets computed for the current frame.

Use of the Gauss image pyramid has two main advantages: First, movements of nodes are much smaller in terms of pixels on a coarser level than in the original image, which makes tracking possible by performing only a local move instead of an exhaustive search in a large image region. Second, the computation of jet components is much faster for lower frequencies, because the computation is performed with a small kernel window on a down sampled image, rather than on a large kernel window on the original resolution image.

Note, that the correspondence level may be chosen dynamically, e.g., in the case of tracking facial features, correspondence level may be chosen dependent on the actual size of the face. Also the size of the Gauss image pyramid may be altered through the tracking process, i.e., the size may be increased when motion gets faster, and decreased when motion gets slower. Typically, the maximal node movement on the coarsest Gauss level is limited to a range of 1 to 4 pixels. Also note that the motion estimation is often performed only on the coarsest level.

The computation of the displacement vector between two given jets on the same Gauss level (the disparity vector), is now described. To compute the displacement between two consecutive frames, a method is used which was originally developed for disparity estimation in stereo images, based on D. J. Fleet and A. D. Jepson, "Computation of component image velocity from local phase information", International Journal of Computer Vision, volume 5, issue 1, pages 77–104, 1990 and on W. M. Theimer and H. A. Mallot, "Phase-based binocular vergence control and depth reconstruction using active vision", CVGIP:Image Understanding, volume 60, issue 3, pages 343–358, November 1994. The strong variation of the phases of the complex filter responses is used explicitly to compute the displacement with subpixel accuracy (See, Wiskott, L., "Labeled Graphs and Dynamic Link Matching for Face Recognition and Scene Analysis", Verlag Harri Deutsch, Thun-Frankfurt am Main, Reihe Physik 53, PhD Thesis, 1995). By writing the response J to the jth Gabor filter in terms of amplitude $\alpha_j$ and phase $\phi_j$, a similarity function can be defined as $$S(J, J', d) = \frac{\sum_j a_j a'_{j'} \cos(\phi_j - \phi_{j'} - d \cdot k_j)}{\sqrt{\sum_j a_j^2 \sum_{j'} a_{j'}^2}} \tag{5}$$

Let J and J' and be two jets at positions X and X'=X+d, the displacement d may be found by maximizing the similarity S with respect to d, the $k_j$ being the wavevectors associated with the filter generating $J_j$. Because the estimation of d is only precise for small displacements, i.e., large overlap of the Gabor jets, large displacement vectors are treated as a first estimate only, and the process is repeated in the following manner. First, only the filter responses of the lowest frequency level are used resulting in a first estimate d_1. Next, this estimate is executed and the jet J is recomputed at the position X_1=X+d_1, which is closer to the position X' of jet J'. Then, the lowest two frequency levels are used for the estimation of the displacement d_2, and the jet J is recomputed at the position X_2=X_1+d_2. This is iterated until the highest frequency level used is reached, and the final disparity d between the two start jets J and J' is given as the sum d=d_1+d_2+.... Accordingly, displacements of up to half the wavelength of the kernel with the lowest frequency may be computed (see Wiskott 1995 supra).

Although the displacements are determined using floating point numbers, jets may be extracted (i.e., computed by convolution) at (integer) pixel positions only, resulting in a systematic rounding error. To compensate for this subpixel error $\Delta d$, the phases of the complex Gabor filter responses should be shifted according to $$\Delta \phi_j = \Delta d \cdot k_j \tag{6}$$

so that the jets will appear as if they were extracted at the correct subpixel position. Accordingly, the Gabor jets may be tracked with subpixel accuracy without any further accounting of rounding errors. Note that Gabor jets provide a substantial advantage in image processing because the problem of subpixel accuracy is more difficult to address in most other image processing methods.

Tracking error also may be detected by determining whether a confidence or similarity value is smaller than a predetermined threshold (block 184 of FIG. 17). The similarity (or confidence) value S may be calculated to indicate how well the two image regions in the two image frames correspond to each other simultaneous with the calculation of the displacement of a node between consecutive image frames. Typically, the confidence value is close to 1, indicating good correspondence. If the confidence value is not close to 1, either the corresponding point in the image has not been found (e.g., because the frame rate was too low compared to the velocity of the moving object), or this image region has changed so drastically from one image frame to the next, that the correspondence is no longer well defined (e.g., for the node tracking the pupil of the eye the eyelid has been closed). Nodes having a confidence value below a certain threshold may be switched off.

A tracking error also may be detected when certain geometrical constraints are violated (block 186). If many nodes are tracked simultaneously, the geometrical configuration of the nodes may be checked for consistency. Such geometrical constraints may be fairly loose, e.g., when facial features are tracked, the nose must be between the eyes and the mouth. Alternatively, such geometrical constraints may be rather accurate, e.g., a model containing the precise shape information of the tracked face. For intermediate accuracy, the constraints may be based on a flat plane model. In the flat plane model, the nodes of the face graph are assumed to be on a flat plane. For image sequences that start with the frontal view, the tracked node positions may be compared to the corresponding node positions of the frontal graph transformed by an affine transformation to the actual frame. The 6 parameters of the optimal affine transformation are found by minimizing the least squares error in the node positions. Deviations between the tracked node positions and the transformed node positions are compared to a threshold. The nodes having deviations larger than the threshold are switched off. The parameters of the affine transformation may be used to determine the pose and relative scale (compared to the start graph) simultaneously (block 188). Thus, this rough flat plane model assures that tracking errors may not grow beyond a predetermined threshold.

If a tracked node is switched off because of a tracking error, the node may be reactivated at the correct position (block 190), advantageously using bunch graphs that include different poses and tracking continued from the corrected position (block 192). After a tracked node has been switched off, the system may wait until a predefined pose is reached for which a pose specific bunch graph exists. Otherwise, if only a frontal bunch graph is stored, the system must wait until the frontal pose is reached to correct any tracking errors. The stored bunch of jets may be compared to the image region surrounding the fit position (e.g., from the flat plane model), which works in the same manner as tracking, except that instead of comparing with the jet of the previous image frame, the comparison is repeated with all jets of the bunch of examples, and the most similar one is taken. Because the facial features are known, e.g., the actual pose, scale, and even the rough position, graph matching or an exhaustive searching in the image and/or pose space is not needed and node tracking correction may be performed in real time.

Figure 20:
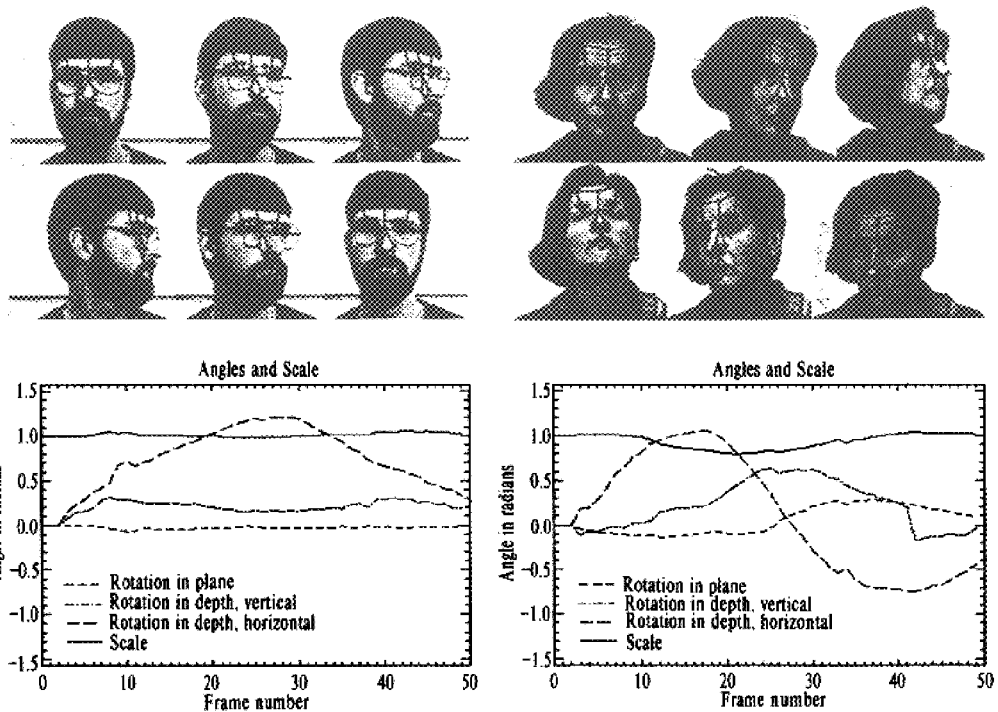
FIG. 20 is a series of two facial images, with accompanying graphs of pose angle versus frame number, showing tracking of facial features over a sequence of 50 image frames.

For tracking correction, bunch graphs are not needed for many different poses and scales because rotation in the image plane as well as scale may be taken into account by transforming either the local image region or the jets of the bunch graph accordingly as shown in FIG. 20. In addition to the frontal pose, bunch graphs need to be created only for rotations in depth.

The speed of the reinitialization process may be increased by taking advantage of the fact that the identity of the tracked person remains the same during an image sequence. Accordingly, in an initial learning session, a first sequence of the person may be taken with the person exhibiting a full repertoire of frontal facial expressions. This first sequence may be tracked with high accuracy using the tracking and correction scheme described above based on a large generalized bunch graph that contains knowledge about many different persons. This process may be performed offline and generates a new personalized bunch graph. The personalized bunch graph then may be used for tracking this person at a fast rate in real time because the personalized bunch graph is much smaller than the larger, generalized bunch graph.

The speed of the reinitialization process also may be increased by using a partial bunch graph reinitialization. A partial bunch graph contains only a subset of the nodes of a full bunch graph. The subset may be as small as only a single node.

Figure 21:
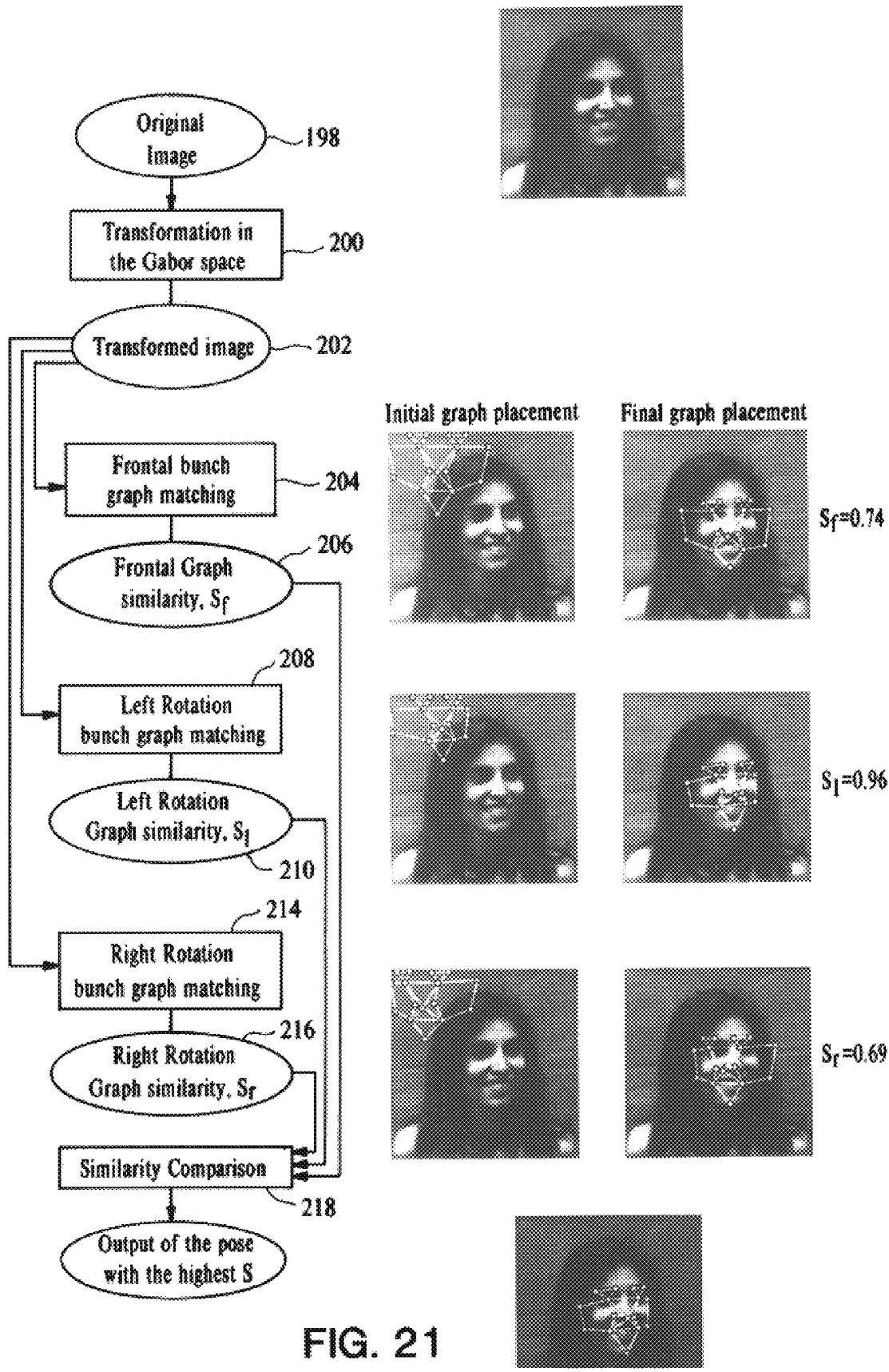
FIG. 21 is a flow diagram, with accompanying photographs, for illustrating a pose estimation technique of the recognition apparatus and system of FIG. 1.

A pose estimation bunch graph makes use of a family of two-dimensional bunch graphs defined in the image plane. The different graphs within one family account for different poses and/or scales of the head. The landmark finding process attempts to match each bunch graph from the family to the input image in order to determine the pose or size of the head in the image. An example of such pose-estimation procedure is shown in FIG. 21. The first step of the pose estimation is equivalent to that of the regular landmark finding. The image (block 198) is transformed (blocks 200 and 202) in order to use the graph similarity functions. Then, instead of only one, a family of three bunch graphs is used. The first bunch graph contains only the frontal pose faces (equivalent to the frontal view described above), and the other two bunch graphs contain quarter-rotated faces (one representing rotations to the left and one to the right). As before, the initial positions for each of the graphs is in the upper left corner, and the positions of the graphs are scanned on the image and the position and graph returning the highest similarity after the landmark finding is selected (blocks 204–214).

After initial matching for each graph, the similarities of the final positions are compared (block 216). The graph that best corresponds to the pose given on the image will have the highest similarity (block 218). In FIG. 21, the left-rotated graph provides the best fit to the image, as indicated by its similarity. Depending on resolution and degree of rotation of the face in the picture, similarity of the correct graph and graphs for other poses would vary, becoming very close when the face is about half way between the two poses for which the graphs have been defined. By creating bunch graphs for more poses, a finer pose estimation procedure may be implemented that would discriminate between more degrees of head rotation and handle rotations in other directions (e.g. up or down).

In order to robustly find a face at an arbitrary distance from the camera, a similar approach may be used in which two or three different bunch graphs each having different scales may be used. The face in the image will be assumed to have the same scale as the bunch graph that returns the most to the facial image.

A three-dimensional (3D) landmark finding techniques related to the technique described above also may use multiple bunch graphs adapted to different poses. However, the 3D approach employs only one bunch graph defined in 3D space. The geometry of the 3D graph reflects an average face or head geometry. By extracting jets from images of the faces of several persons in different degrees of rotation, a 3D bunch graph is created which is analogous to the 2D approach. Each jet is now parametrized with the three rotation angles. As in the 2D approach, the nodes are located at the fiducial points of the head surface. Projections of the 3D graph are then used in the matching process. One important generalization of the 3D approach is that every node has the attached parameterized family of bunch jets adapted to different poses. The second generalization is that the graph may undergo Euclidean transformations in 3D space and not only transformations in the image plane.

The 3D graph matching process may be formulated as a coarse-to-fine approach that first utilizes graphs with fewer nodes and kernels and then in subsequent steps utilizes more dense graphs. The coarse-to-fine approach is particularly suitable if high precision localization of the feature points in certain areas of the face is desired. Thus, computational effort is saved by adopting a hierarchical approach in which landmark finding is first performed on a coarser resolution, and subsequently the adapted graphs are checked at a higher resolution to analyze certain regions in finer detail.

Further, the computational workload may be easily split on a multi-processor machine such that once the coarse regions are found, a few child processes start working in parallel each on its own part of the whole image. At the end of the child processes, the processes communicate the feature coordinates that they located to the master process, which appropriately scales and combines them to fit back into the original image thus considerably reducing the total computation time.

A number of ways have been developed to construct texture mapped 3D models of heads. This section describes a stereo-based approach. The stereo-based algorithms are described for the case of fully calibrated cameras. The algorithms perform area based matching of image pixels and are suitable in the case that dense 3-D information is needed. It then may be used to accurately define a higher object description. Further background information regarding stereo imaging and matching may be found in U. Dhond and J. Aggrawal, "Structure from Stereo: a Review", IEEE Transactions on Systems, Man, and Cybernetics, 19(6), pp. 1489–1510, 1989, or more recently in R. Sara and R. Bajcsy, "On Occluding Contour Artifacts in Stereo Vision", Proc. Int. Conf. Computer Vision and Pattern Recognition, IEEE Computer Society, Puerto Rico, 1997.; M. Okutomi and T. Kanade, "Multiple-baseline Stereo", IEEE Trans. on Pattern Analysis and Machine Intelligence, 15(4), pp. 353–363, 1993; P. Belhumeur, "A Bayesian Approach to Binocular Stereopsis'", Intl. J. of Computer Vision, 19(3), pp. 237–260, 1996; Roy, S. and Cox, I., "Maximum-Flow Formulation of the N-camera Stereo Correspondence Problem", Proc. Int. Conf. Computer Vision, Narosa Publishing House, Bombay, India, 1998; Scharstein, D. and Szeliski, R., "Stereo Matching with Non-Linear Diffusion", Proc. Int. Conf. Computer Vision and Pattern Recognition, IEEE Computer Society, San Francisco, Calif., 1996; and Tomasi, C. and Manduchi, R., "Stereo without Search", Proc. European Conf. Computer Vision, Cambridge, UK, 1996.

An important issue in stereoscopy is known as the correspondence (matching) problem; i.e. to recover range data from binocular stereo, the corresponding projections of the spatial 3-D points have to be found in the left and right images. To reduce the search-space dimension the epipolar constraint is applied (See, S. Maybank and O. Faugeras, "A Theory of Self-Calibration of a Moving Camera", Intl. J. of Computer Vision, 8(2), pp. 123–151, 1992. Stereoscopy can be formulated in a four-step process:

Calibration: compute the camera's parameters.

Rectification: the stereo-pair is projected, so that corresponding features in the images lie on same lines. These lines are called epipolar lines. This is not absolutely needed but greatly improves the performance of the algorithm, as the matching process can be performed, as a one-dimensional search, along horizontal lines in the rectified images.

Matching: a cost function is locally computed for each position in a search window. Maximum of correlation is used to select corresponding pixels in the stereo pair.

Reconstruction: 3-D coordinates are computed from matched pixel coordinates in the stereo pair. Post-processing may be added right after the matching in order to remove matching errors. Possible errors result from matching ambiguities mostly due to the fact that the matching is done locally. Several geometric constraints as well as filtering may be applied to reduce the number of false matches. When dealing with continuous surfaces (a face in frontal position for instance) interpolation may also be used to recover non-matched areas (mostly non-textured areas where the correlation score does not have a clear monomodal maximum).

Figure 22:
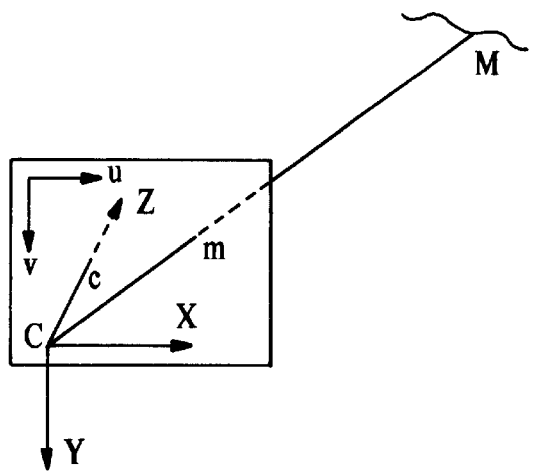
FIG. 22 is a graph of a pinhole camera model showing the orientation of three-dimensional (3-D) view access.
Figure 23:
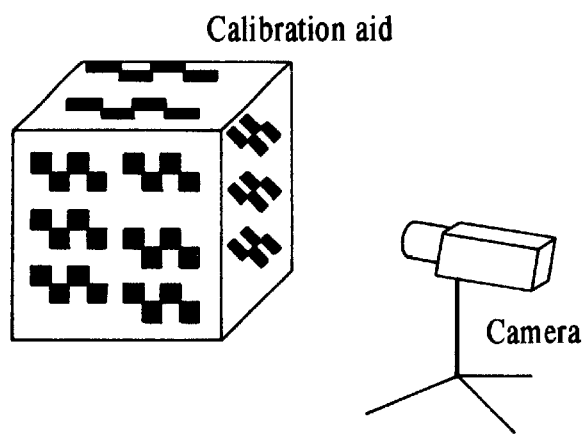
FIG. 23 is a perspective view of a 3-D camera calibration configuration.

The formalism leading to the equations used in the rectification and in the reconstruction process is called projective geometry and is presented in details in 0. Faugeras, "Three-Dimensional Computer Vision, A Geometric Viewpoint", MIT Press, Cambridge, Massachusetts, 1993. The model used provides significant advantages. Generally, a simple pinhole camera model, shown in FIG. 22, is assumed. If needed, lens distortion can also be computed at calibration time (the most important factor being the radial lens distortion). From a practical point of view the calibration is done using a calibration aid, i.e. an object with known 3-D structure. Usually, a cube with visible dots or a squared pattern is used as a calibration aid as shown in FIG. 23.

Figure 24:
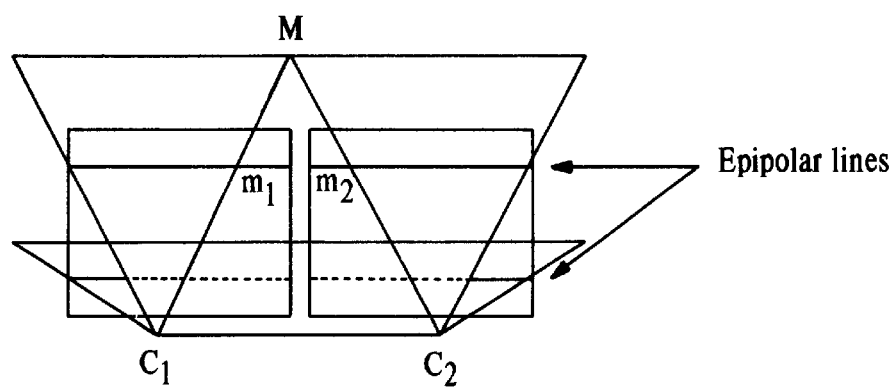
FIG. 24 is schematic diagram of rectification for projecting corresponding pixels of stereo images along the same line numbers.

To simplify the rectification algorithms, the input images of each stereo pair are first rectified, (see, N. Ayache and C. Hansen, "Rectification of Images for Binocularand Trinocular Stereovision", Proc. of 9th International Conference on Pattern Recognition, 1, pp. 11–16, Italy, 1988), so that corresponding points lie on the same image lines. Then, by definition, corresponding points have coordinates $(u_L, v_L)$ and $(u_L-d, v_L)$, in left and right rectified images, where "d" is known as the disparity. For details on the rectification process refer to Faugeras, supra. The choice of the rectifying plane (plane used to project the images to obtain the rectified images) is important. Usually this plane is chosen to minimize the distortion of the projected images, and such that corresponding pixels are located along the same line number (epipolar lines are parallel and aligned) as shown in FIG. 24. Such a configuration is called standard geometry.

Figure 25:
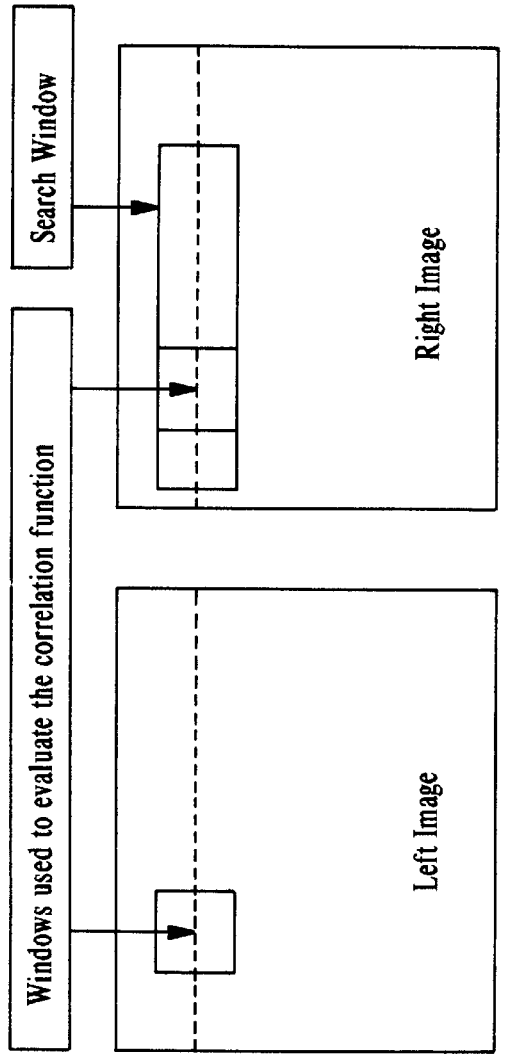
FIG. 25 are image frames showing a correlation matching process between a window of one image frame and a search window of the other image frame.
Figure 27:
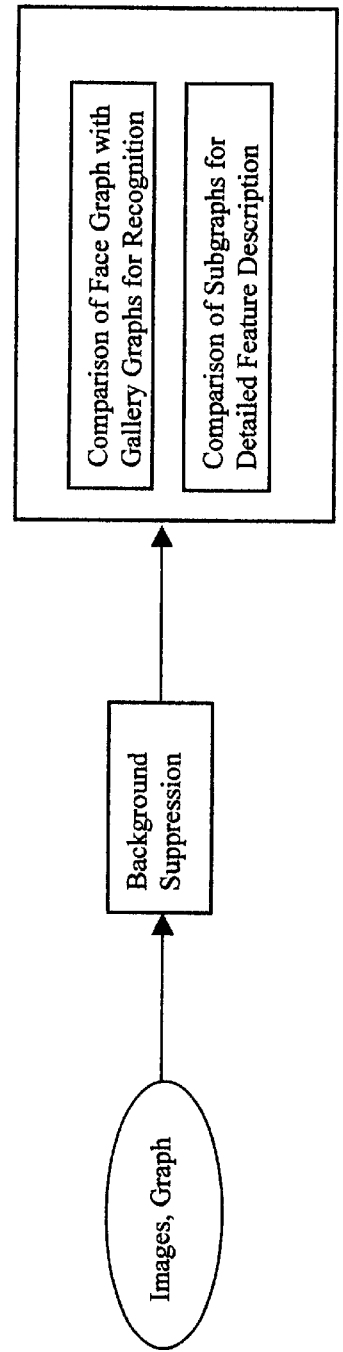
FIG. 27 is a flow chart an image identification process, according to the invention.
Figure 26:
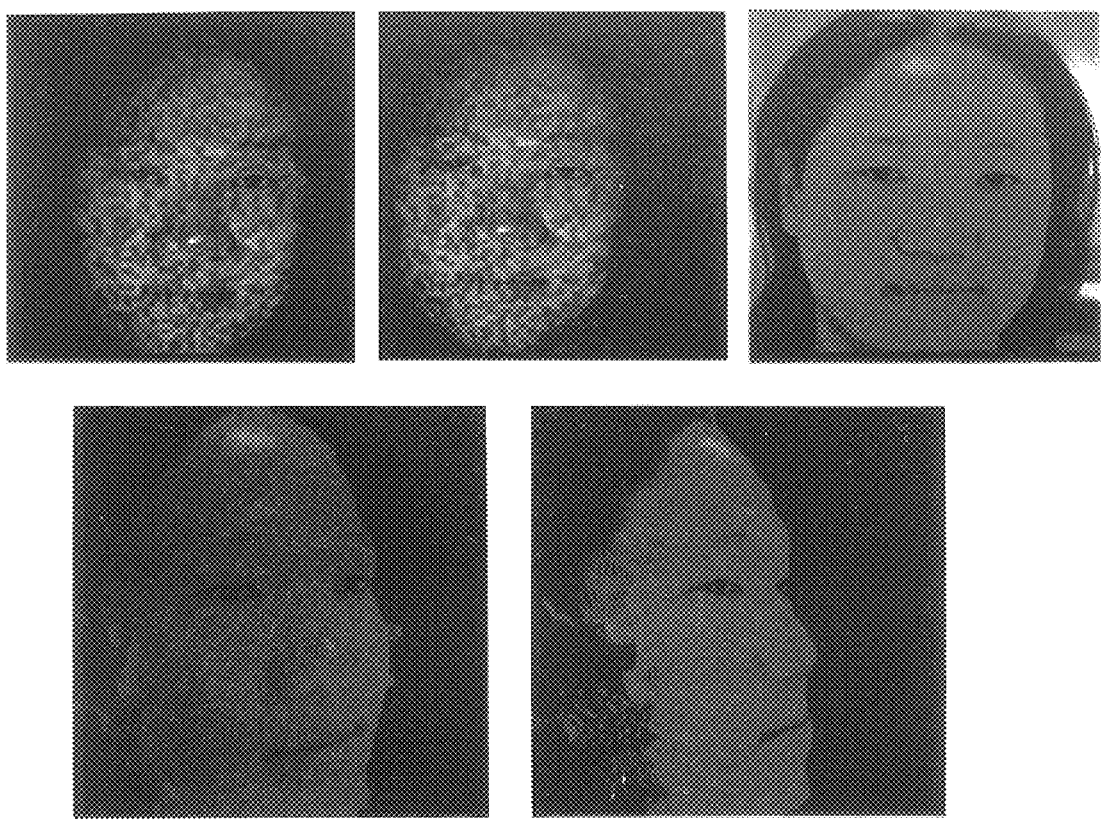
FIG. 26 are images of a stereo image pair, disparity map and image reconstruction illustrating 3-D image decoding.

With reference to FIG. 26, matching is the process of finding corresponding points in left and right images. Several correlation functions may be used to measure this disparity; for instance the normalized cross-correlation (see, H. Moravec, "Robot Rover Visual Navigation", Computer Science: Artificial Intelligence, pp. 13–15, 105–108, UMI Research Press 1980/1981) is given by:

$$c(I_L, I_R) = 2 \, cov(I_L, I_R)/(var(I_L) + var(I_R)) \qquad (6)$$

Where $I_L$ and $I_R$ are the left and right rectified images. The correlation function is applied on a rectangular area at point $(u_L, v_L)$ and $(u_R, v_R)$. The cost function $c(I_L, I_R)$ is computed, as shown in FIG. 25 for the search window that is of size 1×N (because of the rectification process), where N is some admissible integer. For each pixel $(u_L, v_L)$ in the left image, the matching produces a correlation profile $c(u_L, v_L, d)$ where "d" is defined as the disparity at the point $(u_L, v_L)$, i.e.:

$$d_u = u_R - u_L \qquad (7)$$

$$d_v = 0 \qquad (8)$$

The second equation expresses the fact that epipolar lines are aligned. As a result the matching procedure outputs a disparity map, or an image of disparities that can be superimposed to a base image (here the left image of the stereo pair). The disparity map tells "how much to move along the epipolar line to find the corespondent of the pixel in the right image of the stereo pair".

Several refinements may be used at matching time. For instance a list of possible corespondents can be kept at each point and constraints such as the visibility constraint, ordering constraint, and disparity gradient constraint (see, A. Yuille and T. Poggio, "A Generalized Ordering Constraint for Stereo Correspondence", MIT, Artificial Intelligence Laboratory Memo, No. 777, 1984; Dhond et al., supra; and Faugeras, supra.) can be used to remove impossible configurations (see, R. Sara et al.,1997, supra). One can also use cross-matching, where the matching is performed from left to right then from right to left, and a candidate (correlation peak) is accepted if both matches lead to the same image pixel, i.e. if, $$d_{LR} = u_L - u_R = -d_{RL} \qquad (9)$$

where $d_{LR}$ is the disparity found matching left to right and $d_{RL}$ right to left. Moreover a pyramidal strategy can used to help the whole matching process by restraining the search window. This is implemented carrying the matching at each level of a pyramid of resolution, using the estimation of the preceeding level. Note that a hierarchical scheme enforces also surface continuity.

Note that when stereo is used for 2-D segmentation purposes, only the disparity map is needed. One can then avoid using the calibration process described previously, and use a result of projective geometry (see, Q. T. Luong, "Fundamental Matrix and autocalibration in Computer Vision", Ph.D. Thesis, University of Paris Sud, Orsay, France, December 1992) showing that rectification can be achieved if the Fundamental Matrix is available. The fundamental matrix can be used in turn to rectify the images, so that matching can be carried out as described previously.

To refine the 3-D position estimates, a subpixel correction of the integer disparity map is computed which results in a subpixel disparity map. The subpixel disparity can be obtained either:

using a second order interpolation of the correlation scores around the detected maximum, using a more general approach as described in F. Devernay, "Computing Differential Properties of {3-D} Shapes from Stereoscopic Images without {3-D} Models", INRIA, RR-2304, Sophia Antipolis, 1994 (which takes into account the distortion between left and right correlation windows, induced by the perspective projection, assuming that a planar patch of surface is imaged).

The first approach is the fastest while the second approach gives more reliable estimations of the subpixel disparity. To achieve fast subpixel estimation, while preserving the accuracy of the estimation, we proceed as follows. Let $I_L$ and $I_R$ are the left and the right rectified images. Let $\epsilon$ be the unknown subpixel correction, and A(u, v) be the transformation that maps the correlation window from the left to the right image (for a planar target it is an affine mapping that preserves image rows). For corresponding pixels in the left and right images, $$I_R(u_L - d + \epsilon, v_L) = \alpha I_L(A(u_L, v_L)) \qquad (10)$$

where the coefficient a takes into account possible differences in camera gains. A first order linear approximation of the above formula respect to '$\epsilon$' and 'A' gives a linear system where each coefficient is estimated over the corresponding left and right correlation windows. A least-squares solution of this linear system provides the subpixel correction.

Note that in the case a continuous surface is to be recovered (as for a face in frontal pose), an interpolation scheme can be used on the filtered disparity map. Such a scheme can be derived from the following considerations. As we suppose the underlying surface to be continuous, the interpolated and smoothed disparity map $\underline{d}$ has to verify the following equation:

$$\min_{\underline{d}} \{ \iint [(d' - \underline{d}) + \lambda (\nabla \underline{d})^2] du \, dv \} \qquad (11)$$

where $\lambda$ is a smoothing parameter and the integration is taken over the image (for pixel coordinates u and v). An iterative algorithm is straightforwardly obtained using Euler equations, and using an approximation of the Laplacian operator $\nabla$.

From the disparity map, and the camera calibration the spatial position of the 3D points are computed based on triangulation (see Dhond et. al., supra). The result of the reconstruction (from a single stereo pair of images) is a list of spatial points.

In the case several images are used (polynocular stereo) a verification step may be used (see, R. Sara, "Reconstruction of 3-D Geometry and Topology from Polynocular Stereo", http://cmp.felk.cvut.cz/~sara). During this procedure, the set of reconstructed points, from all stereo pairs, is re-projected back to disparity space of all camera pairs and verified if the projected points match their predicted position in the other image of each of the pairs. It appears that the verification eliminates outliers (especially the artifacts of matching near occlusions) very effectively.

FIG. 26 shows a typical result of applying a stereo algorithm to a stereo pair of images obtained projecting textured light. The top row of FIG. 26 shows the left right and a color image taken in a short time interval insuring that the subject did not move. The bottom row shows two views of the reconstructed face model obtained applying stereo to the textured images, and texture mapped with the color image. Note that interpolation and filtering has been applied to the disparity map, so that the reconstruction over the face is smooth and continuous. Note also that the results is displayed as the raw set of points obtained from the stereo; these points can be meshed together to obtain a continuous surface for instance using the algorithm positions can be compared with the jets extracted from stored gallery images. Either complete graphs are compared, as it is the case for face recognition applications, or just partial graphs or even individual nodes are.

Before the jets are extracted for the actual comparison, a number of image normalizations are applied. One such normalization is called background suppression. The influence of the background on probe images needs to be suppressed because different backgrounds between probe and gallery images lower similarities and frequently leads to misclassifications. Therefore we take nodes and edges surrounding the face as face boundaries. Background pixels get smoothly toned down when deviating from the face. Each pixel value outside of the head is modified as follows:

$$p_{new} = p_{old} \cdot \lambda + c \cdot (1-\lambda) \quad (12)$$

where $$\lambda = \exp\left(-\frac{d}{d_0}\right) \quad (13)$$

and c is a constant background gray value that represents the Euclidean distance of the pixel position from the closest edge of the graph. $d_0$ is a constant tone down value. Of course, other functional dependencies between pixel value and distance from the graph boundaries are possible.

Figure 28:
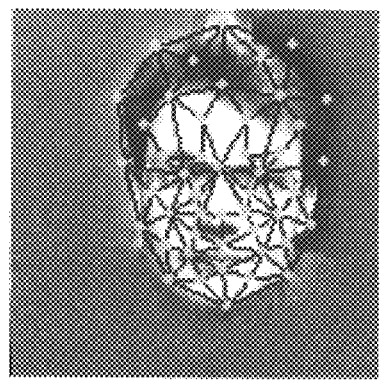
FIG. 28 is an image showing the use of background suppression.

As shown in FIG. 28, the automatic background suppression drags the gray value smoothly to the constant when deviating from the closest edge. This method still leaves a background region surrounding the face visible, but it avoids strong disturbing edges in the image, which would occur if this region was simply filled up with a constant gray value.

While the foregoing has been with reference to specific embodiments of the invention, it will be appreciated by those skilled in the art that these are illustrations only and that changes in these embodiments can be made without departing from the principles of the invention, the scope of which is defined by the appended claims.

What is claimed is:

1. A process for recognizing objects in an image frame, comprising steps for:
   detecting an object in the image frame and bounding a portion of the image frame associated with the object resulting in a bound portion of the image frame that is associated with the object and an unbound portion of the image frame that is not associated with the object;
   transforming only the bound portion and not the unbound portion of the image frame using a wavelet transformation to generate a transformed image;
   locating, on the transformed image, nodes associated with distinguishing features of the object defined by wavelet jets of a bunch graph generated from a plurality of representative object images;
   identifying the object based on a similarity between wavelet jets associated with an object image in a gallery of object images and wavelet jets at the nodes on the transformed image.

2. A process for recognizing objects as defined in claim 1, further comprising sizing and centering the detected object within the bound portion of the image such that the detected object has a predetermined size and location within the bound portion.

3. A process for recognizing objects as defined in claim 1, further comprising a step for suppressing a background portion, of the bound portion of the image frame, that is not representing the object, prior to identifying the object.

4. A process for recognizing objects as defined in claim 3, wherein the suppressed background portion is gradually suppressed near edges of the object in the bound portion of the image frame.

5. A process for recognizing objects as defined in claim 1, wherein the object is a head of a person exhibiting a facial region.

6. A process for recognizing objects as defined in claim 1, wherein the bunch graph is based on a three-dimensional representation of the object.

7. A process for recognizing objects as defined in claim 1, wherein the wavelet transformation is performed using phase calculations that are performed using a hardware adapted phase representation.

8. A process for recognizing objects as defined in claims 1, wherein the locating step is performed using a coarse-to-fine approach.

9. A process for recognizing objects as defined in claim 1, wherein the bunch graph is based on predetermined poses.

10. A process for recognizing objects as defined in claim 1, wherein in the identifying step uses a three-dimensional representation of the object.

11. A process for recognizing objects as defined in claim 1, wherein the bound portion covers less than ten percent of the image frame.

12. A process for recognizing objects as defined in claim 1, wherein the step for detecting the object includes detecting a color associated with the object.

13. A process for recognizing objects in a sequence of image frames, comprising:
   detecting an object in the image frames and bounding a portion of each image frame associated with the object;
   transforming the bound portion of each image frame using a wavelet transformation to generate a transformed image;
   locating, on the transformed images, nodes associated with distinguishing features of the object defined by wavelet jets of a bunch graph generated from a plurality of representative object images;
   identifying the object based on a similarity between wavelet jets associated with an object image in a gallery of object images and wavelet jets at the nodes on the transformed images.

14. A process for recognizing objects as defined in claim 13, wherein the step of detecting an object further comprises tracking the object between image frames based on a trajectory associated with the object.

15. A process for recognizing objects as defined in claim 13, further comprising a preselecting process that chooses a most suitable view of an object out of sequence of views that belong to a particular trajectory.

16. A process for recognizing objects as defined in claim 13, wherein the step of locating the nodes includes tracking the nodes between image frames.

17. A process for recognizing objects as defined in claim 16, further comprising reinitializing a tracked node if the node's position deviates beyond a predetermined position constraint between image frames.

18. A process for recognizing objects as defined in claim 17, wherein the predetermined position constraint is based on a geometrical position constraint associated with relative positions between the node locations.

19. A process for recognizing objects as defined in claim 13, wherein the image frames are stereo images and the step of detecting includes generating a disparity histogram and a silhouette image to detect the object.

20. A process for recognizing objects as defined in claim 19, wherein the disparity histogram and silhouette image generate convex regions which are associated with head movement and which are detected by a convex detector.

21. A process for recognizing objects as defined in claim 13, wherein the wavelet transformations are performed using phase calculations that are performed using a hardware adapted phase representation.

22. A process for recognizing objects as defined in claim 13, wherein the bunch graph is based on a three-dimensional representation of the object.

23. A process for recognizing objects as defined in claim 13, wherein the locating step is performed using a coarse-to-fine approach.

24. A process for recognizing objects as defined in claim 13, wherein the bunch graph is based on predetermined poses.

25. A process for recognizing objects as defined in claim 13, wherein the bound portion covers less than ten percent of the image frame.

26. A process for recognizing objects as defined in claim 13, wherein the step for detecting the object includes detecting a color associated with the object.

27. A process for recognizing objects as defined in claim 13, wherein the step for detecting the object includes detecting movement associated with the object in the sequence of image frames.

28. Apparatus for recognizing objects in an image, comprising:

means for detecting an object in the image frame and bounding a portion of the image frame associated with the object resulting in a bound portion of the image frame that is associated with the object and an unbound portion of the image frame that is not associated with the object;

means for transforming only the bound portion and not the unbound portion of the image frame using a wavelet transformation to generate a transformed image;

means for locating, on the transformed image, nodes associated with distinguishing features of the object defined by wavelet jets of a bunch graph generated from a plurality of representative object images;

means for identifying the object based on a similarity between wavelet jets associated with an object image in a gallery of object images and wavelet jets at the nodes on the transformed image.

29. Apparatus for recognizing objects as defined in claim 28, wherein the bound portion covers less than ten percent of the image frame.

30. Apparatus for recognizing objects as defined in claim 28, wherein the means for detecting the object includes a neural network.

31. Apparatus for recognizing objects as defined in claim 28, wherein the means for detecting the object includes means for detecting a color associated with the object.

32. Apparatus for recognizing objects as defined in claim 28, further comprising means for suppressing a background portion, of the bound portion of the image frame, that is not representing the object, prior to identifying the object.

33. Apparatus for recognizing objects as defined in claim 32, wherein the suppressed background portion is gradually suppressed near edges of the object in the bound portion of the image frame.

34. Apparatus for recognizing objects in a sequence of image frames, comprising:

means for detecting an object in the image frames and bounding a portion of each image frame associated with the object resulting in a bound portion of each image frame that is associated with the object and an unbound portion of each image frame that is not associated with the object;

means for transforming only the bound portion and not the unbound portion of each image frame using a wavelet transformation to generate a transformed image;

means for locating, on the transformed images, nodes associated with distinguishing features of the object defined by wavelet jets of a bunch graph generated from a plurality of representative object images;

means for identifying the object based on a similarity between wavelet jets associated with an object image in a gallery of object images and wavelet jets at the nodes on the transformed images.

35. Apparatus for recognizing objects as defined in claim 34, wherein the bound portion covers less than ten percent of each image frame.

36. Apparatus for recognizing objects as defined in claim 34, wherein the means for detecting the object includes a neural network.

37. Apparatus for recognizing objects as defined in claim 34, wherein the means for detecting the object includes means for detecting a color associated with the object.

38. Apparatus for recognizing objects as defined in claim 34, wherein the means for detecting an object further comprises means for tracking the object between image frames based on a trajectory associated with the object.

39. Apparatus for recognizing objects as defined in claim 34, wherein the means for locating the nodes includes means for tracking the nodes between image frames.

40. Apparatus for recognizing objects as defined in claim 39, further comprising means for reinitializing a tracked node if the node's position deviates beyond a predetermined position constraint between image frames.

41. Apparatus for recognizing objects as defined in claim 40, wherein the predetermined position constraint is based on a geometrical position constraint associated with relative positions between the node locations.

42. Apparatus for recognizing objects as defined in claim 34, wherein the means for transforming uses a hardware adapted phase representation for performing phase calculations.

* * * * *

UNITED STATES PATENT AND TRADEMARK OFFICE
CERTIFICATE OF CORRECTION

PATENT NO.    : 6,301,370 B1
DATED         : October 9, 2001
INVENTOR(S)   : Steffens et al.

Page 1 of 1

It is certified that error appears in the above-identified patent and that said Letters Patent is hereby corrected as shown below:

<u>Column 20, claim 8,</u>
Line 22, please delete "claims" and insert -- claim --.

Signed and Sealed this

Nineteenth Day of March, 2002

Attest:

Attesting Officer

JAMES E. ROGAN
Director of the United States Patent and Trademark Office